United States Patent
Mckuin et al.

(10) Patent No.: US 10,017,368 B2
(45) Date of Patent: Jul. 10, 2018

(54) CAP GRIPPER

(71) Applicant: The Wine Group, Inc., Livermore, CA (US)

(72) Inventors: Earl Mckuin, Modesto, CA (US); Fernando Santos, Ripon, CA (US)

(73) Assignee: THE WINE GROUP, INC., Livermore, CA (US)

( * ) Notice: Subject to any disclaimer, the term of this patent is extended or adjusted under 35 U.S.C. 154(b) by 734 days.

(21) Appl. No.: 14/553,909

(22) Filed: Nov. 25, 2014

(65) Prior Publication Data

US 2016/0145086 A1    May 26, 2016

(51) Int. Cl.
| | | |
|---|---|---|
| *B67B 3/20* | (2006.01) | |
| *B67B 3/26* | (2006.01) | |
| *B67B 1/00* | (2006.01) | |
| *B65B 7/28* | (2006.01) | |
| *B65G 47/90* | (2006.01) | |

(52) U.S. Cl.
CPC ............... *B67B 1/005* (2013.01); *B65B 7/28* (2013.01); *B65G 47/90* (2013.01)

(58) Field of Classification Search
CPC .. B67B 1/005; B67B 7/02; B67B 1/04; B65B 7/28; B65B 3/045; B65G 47/90
USPC ...... 53/468, 381.4, 281, 109, 287, 310, 313, 53/319, 329, 342, 345, 346, 359; 294/90
See application file for complete search history.

(56) References Cited

U.S. PATENT DOCUMENTS

| | | | | |
|---|---|---|---|---|
| 1,155,119 A | * | 9/1915 | Winter | B67B 1/04 53/321 |
| 1,490,445 A | * | 4/1924 | Wilson | E21B 19/06 294/90 |
| 1,681,959 A | * | 8/1928 | Tevander | B67B 3/10 53/350 |
| 1,866,125 A | * | 7/1932 | Patterson | B67B 7/02 254/104 |
| 2,142,695 A | * | 1/1939 | Mainzer | B67B 7/02 30/1.5 |
| 2,180,836 A | * | 11/1939 | Risser | B67B 1/005 221/169 |
| 2,679,345 A | * | 5/1954 | Haynes | B67B 1/005 221/298 |
| 2,710,714 A | * | 6/1955 | Worth | B67B 1/005 141/161 |

(Continued)

FOREIGN PATENT DOCUMENTS

| | | | | |
|---|---|---|---|---|
| EP | 0252345 A2 | * | 1/1988 | B63B 3/045 |
| EP | 0488901 A1 | * | 6/1992 | B67B 1/04 |

*Primary Examiner* — Hemant M Desai
*Assistant Examiner* — Lucas Palmer
(74) *Attorney, Agent, or Firm* — Ascenda Law Group, PC

(57) ABSTRACT

A cap gripper is described herein with a groove for receiving a projecting portion of a cap. A positively biased member may create a narrowing in the groove to secure the projecting portion of the cap within the groove. The positively biased member may be positively biased by a spring-loaded screw that is inserted into a screw hole of the cap gripper. When the cap is inserted into the cap gripper, the positively biased member may be partially depressed within the screw hole to allow the projecting portion of the cap to be inserted into the groove. Likewise, when the cap is removed from the cap gripper, the positively biased member may be partially depressed within the screw hole to allow the projecting portion of the cap to be removed from the groove.

17 Claims, 29 Drawing Sheets

(56) References Cited

U.S. PATENT DOCUMENTS

| | | | | | |
|---|---|---|---|---|---|
| 2,722,450 A * | 11/1955 | Nelson | E21B 19/06 294/110.1 |
| 2,737,330 A * | 3/1956 | Halahan | B67B 1/04 53/306 |
| 2,738,118 A * | 3/1956 | Hall | B67B 1/005 29/429 |
| 2,797,541 A * | 7/1957 | Cookson | B67B 1/005 53/306 |
| 2,840,969 A * | 7/1958 | Halahan | B67B 1/005 53/310 |
| 2,891,366 A * | 6/1959 | Stover | B67B 3/18 53/361 |
| 3,087,518 A * | 4/1963 | Scholle | B65B 3/045 141/315 |
| 3,098,334 A * | 7/1963 | Edwards | B65D 41/348 53/468 |
| 3,242,951 A * | 3/1966 | Curie | B65B 3/045 141/21 |
| 3,264,027 A * | 8/1966 | Luther | B65H 67/065 294/115 |
| 3,282,026 A * | 11/1966 | Cozzoli | B67B 1/04 53/306 |
| 3,299,606 A * | 1/1967 | Weikert | B65B 43/40 141/114 |
| 3,299,607 A * | 1/1967 | Dopp | B65B 31/046 426/404 |
| 3,377,775 A * | 4/1968 | Mattimoe | B65B 43/40 53/109 |
| 3,383,836 A * | 5/1968 | Salminen | B67B 1/04 493/104 |
| 3,403,826 A * | 10/1968 | Buford | B65B 3/045 141/114 |
| 3,432,989 A * | 3/1969 | Bouzereau | B67B 1/005 53/264 |
| 3,516,220 A * | 6/1970 | Buford | B65B 3/28 141/313 |
| 3,534,523 A * | 10/1970 | Davidson | B65B 3/16 53/268 |
| 3,817,126 A * | 6/1974 | Koebbeman | B67B 7/162 81/3.44 |
| 3,845,963 A * | 11/1974 | Price | B23B 31/16 279/133 |
| 3,906,706 A * | 9/1975 | Conti | B67B 3/2066 53/331.5 |
| 3,950,922 A * | 4/1976 | Eberhardt | B65B 7/28 53/356 |
| 4,033,205 A * | 7/1977 | Hoskins | B67B 7/18 81/3.42 |
| 4,120,134 A * | 10/1978 | Scholle | B65B 43/123 141/114 |
| 4,283,901 A * | 8/1981 | Schieser | B65B 43/60 53/272 |
| 4,363,203 A * | 12/1982 | Marshall | B65B 3/045 53/109 |
| 4,363,338 A * | 12/1982 | Brown | B65B 3/045 141/114 |
| 4,373,316 A * | 2/1983 | Kobayashi | B67B 1/04 53/306 |
| 4,386,636 A * | 6/1983 | Ellert | B65B 3/045 141/10 |
| 4,406,182 A * | 9/1983 | Antone | B67B 7/066 29/266 |
| 4,446,674 A * | 5/1984 | Inada | B65B 1/34 141/114 |
| 4,458,734 A * | 7/1984 | Scholle | B65B 55/022 141/5 |
| 4,481,753 A * | 11/1984 | Rutter | B65B 3/045 141/10 |
| 4,498,508 A * | 2/1985 | Scholle | B65B 55/022 141/372 |
| 4,510,737 A * | 4/1985 | Ellert | B65B 43/123 53/255 |
| 4,550,846 A * | 11/1985 | Phillips | B65D 39/04 215/296 |
| 4,574,559 A * | 3/1986 | Rutter | B65B 7/28 53/268 |
| 4,590,821 A * | 5/1986 | Olson | B67B 7/066 81/3.25 |
| 4,676,285 A * | 6/1987 | Schieser | B65B 3/045 141/114 |
| 4,999,978 A * | 3/1991 | Kohlbach | B65B 55/022 141/114 |
| 5,050,722 A * | 9/1991 | Beswick | B67B 1/005 198/392 |
| 5,095,681 A * | 3/1992 | Choi | B67B 3/22 198/394 |
| 5,129,212 A * | 7/1992 | Duffey | B65B 55/022 141/10 |
| 5,150,559 A * | 9/1992 | Winfield | B65B 7/28 53/133.2 |
| 5,275,070 A * | 1/1994 | St. Denis | B67B 7/066 81/3.29 |
| 5,402,623 A * | 4/1995 | Ahlers | B67B 3/02 53/268 |
| 5,495,699 A * | 3/1996 | Buckley, Jr. | F17C 5/005 53/329.2 |
| 5,711,201 A * | 1/1998 | Thompson | B26D 1/02 30/278 |
| 5,967,000 A * | 10/1999 | Davis | B67B 7/02 81/3.07 |
| 6,070,622 A * | 6/2000 | Rutter | B65B 39/004 141/10 |
| 6,158,305 A * | 12/2000 | Slepicka | B67B 7/162 81/3.25 |
| 6,309,603 B1 * | 10/2001 | Locke | B67B 7/02 210/360.1 |
| 6,523,330 B1 * | 2/2003 | Hurd | B65B 43/50 53/289 |
| 6,655,109 B2 * | 12/2003 | Resterhouse | B65B 7/2807 53/266.1 |
| 6,889,482 B2 | 5/2005 | Edwards et al. | |
| 8,528,304 B2 * | 9/2013 | Miyazaki | B65D 1/0261 53/127 |
| 2003/0103839 A1 * | 6/2003 | Osborne | B65B 69/00 414/411 |
| 2004/0068957 A1 * | 4/2004 | Edwards | B65B 3/04 53/268 |
| 2004/0104243 A1 * | 6/2004 | Osborne | B65B 3/003 222/63 |
| 2004/0154690 A1 * | 8/2004 | Osborne | B01F 13/1072 141/27 |
| 2006/0016159 A1 * | 1/2006 | Wohlgemuth | B65B 7/2821 53/485 |
| 2008/0196358 A1 * | 8/2008 | Schafer-Roth | B67B 1/005 53/67 |
| 2010/0061831 A1 * | 3/2010 | Nishino | A61L 2/087 414/225.01 |
| 2010/0151069 A1 * | 6/2010 | Ng | B29C 49/4205 425/150 |
| 2010/0186348 A1 * | 7/2010 | Nighy | B65B 3/045 53/284.7 |
| 2010/0282574 A1 * | 11/2010 | Ueda | B65G 17/323 198/803.3 |
| 2010/0289287 A1 * | 11/2010 | Preti | B65G 47/847 294/116 |
| 2010/0308611 A1 * | 12/2010 | Sarda | B65G 29/00 294/90 |
| 2012/0317936 A1 * | 12/2012 | Murray | B65B 3/045 53/545 |
| 2015/0203342 A1 * | 7/2015 | Witte | B29B 11/14 220/495.06 |

* cited by examiner

CAP GRIPPER

FIELD OF THE INVENTION

The present invention relates to a device for gripping caps, and more particularly relates to a device for gipping caps on containers in the process of filling the containers with a liquid.

BACKGROUND

In a machine-facilitated process of filling a container with liquid, a cap gripper may be employed by a filling machine to remove a cap from the container so that the container may be filled with a liquid. Once the container has been filled with the liquid, the cap gripper may be employed by the filling machine to place the cap back onto the container in order to seal the liquid within the container.

While certain cap grippers have been proposed (see, e.g., those described in U.S. Pat. No. 4,283,901 to Schieser et al., U.S. Pat. No. 4,363,203 to Marshall et al., U.S. Pat. No. 4,481,753 to Rutter et al., U.S. Pat. No. 6,889,482 to Edwards et al., and EP 0 252 345 to Paul Kunz, the respective entireties of each being incorporated herein by reference), these cap grippers do not appear to offer one or more of the advantages provided by the cap grippers described below.

SUMMARY OF THE INVENTION

In accordance with one embodiment, a cap gripper may comprise a groove for receiving a projecting portion of a cap. A positively biased member may create a narrowing in the groove to secure the projecting portion of the cap within the groove. The positively biased member may be positively biased by a spring-loaded screw that is inserted into a screw hole of the cap gripper. When the cap is inserted into the cap gripper, the positively biased member may be partially depressed and/or refracted into the screw hole to allow the projecting portion of the cap to be inserted into the groove. Likewise, when the cap is removed from the cap gripper, the positively biased member may be partially depressed and/or retracted into the screw hole to allow the projecting portion of the cap to be removed from the groove.

In accordance with one embodiment, a filling machine is retrofitted with a particular cap gripper. A first cap gripper may be detached from the filling machine. Then, at substantially the location where the first cap gripper was formerly attached to the filling machine, a second cap gripper may be attached to the filling machine. The second cap gripper may comprise a groove configured to receive a radially projecting portion of a cap, and a movement impeding member including a positively biased member arranged to secure the radially projecting portion of the cap within the groove. The positively biased member may create a narrowing in the groove.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Figure 1:
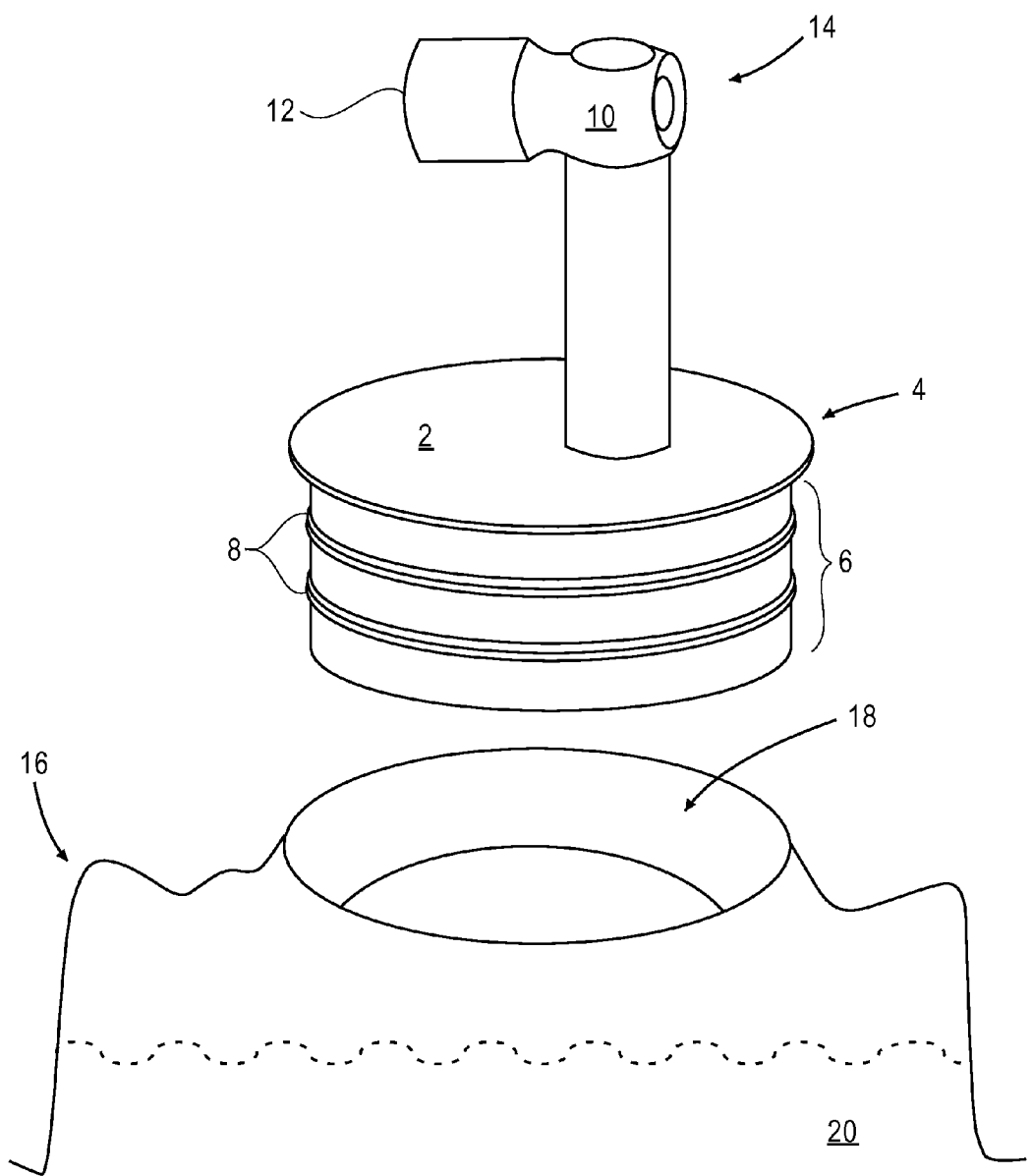
FIG. 1 depicts a perspective illustration of a cap with a flanged-shaped radially projecting portion, a spigot and a container for holding liquid.

FIG. 1 depicts a perspective view of cap 2 (e.g., a fitment, container sealing mechanism, etc.) which may be gripped (e.g., held, secured, etc.) by the cap gripper (described below). Cap 2 may contain projecting portion 4. While the projecting portion is shaped as a flange in FIG. 1, different type of caps (e.g., manufactured by different vendors) may have differently shaped projecting portions. For example, the projecting portion may be shaped as a rectangle, square (see FIG. 18), oval, triangle, etc. Cap 2 may also contain base 6. In the instance where base 6 is shaped as a cylinder, tube or annulus, a radius may be associated with base 6, and projecting portion 4 may more specifically be referred to as a radially-projecting portion. While projecting portion 4 is illustrated as being located at an end portion (e.g., top) of cap 2, projecting portion 4 could more generally be located at a central portion of cap 2, similar to the respective positions of ribbed portions 8 (described below).

Base 6 of cap 2 may be inserted into opening 18 of container 16 (e.g., a bag-in-box, a bag, a bottle, a jar, etc.). To form a liquid-tight seal, it is desired that the cross-sectional shape of base 6 be substantially identical to the cross-sectional shape of opening 18. As a result of ribbed portions 8 of base 6 (which create a friction fit between cap 2 and container 16), cap 2 must be inserted into opening 18 with a suitable amount of force, as well as removed from opening 18 with a suitable amount of force. Such amount of force is preferably greater than that which can be imparted by liquid 20 (e.g., wine, beer, water, oil, a fruit beverage, an alcoholic beverage, etc.), thereby preventing liquid 20 from dislodging cap 2 (e.g., when container 16 is positioned with opening 18 facing downwards or to the side).

A spigot 10 may be attached to an opening (not depicted) in the top face of cap 2, allowing liquid 20 to be dispensed through opening 12 of the spigot. In a typical operation, it is expected that opening 12 of spigot will be positioned downwards (i.e., aligned with the direction of gravity). Spigot may contain spigot control 14 which may be operated by a human (for example, by depressing a button) to control the time when and/or rate at which fluid 20 is dispensed.

Figure 2:
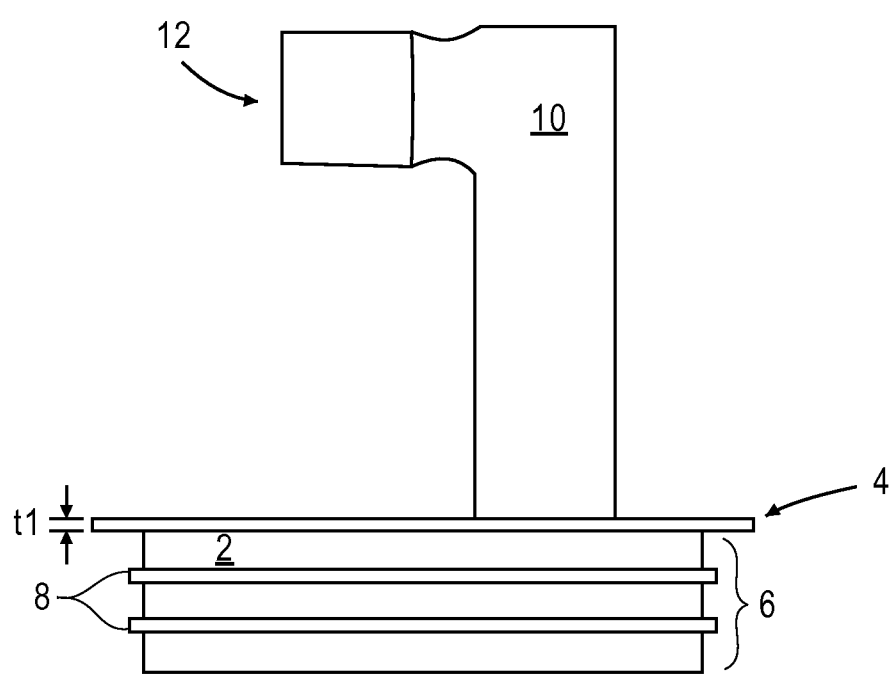
FIG. 2 depicts a side view of a cap with a spigot.

FIG. 2 depicts a side-view of cap 2. A thickness, t1, of projecting portion 4 of cap 2 is indicated in FIG. 2. In many cases, the thickness of projecting portion 4 is uniform, but the cap gripper (described below) could be adapted for caps for which projecting portion 4 has a non-uniform thickness.

Figure 3:
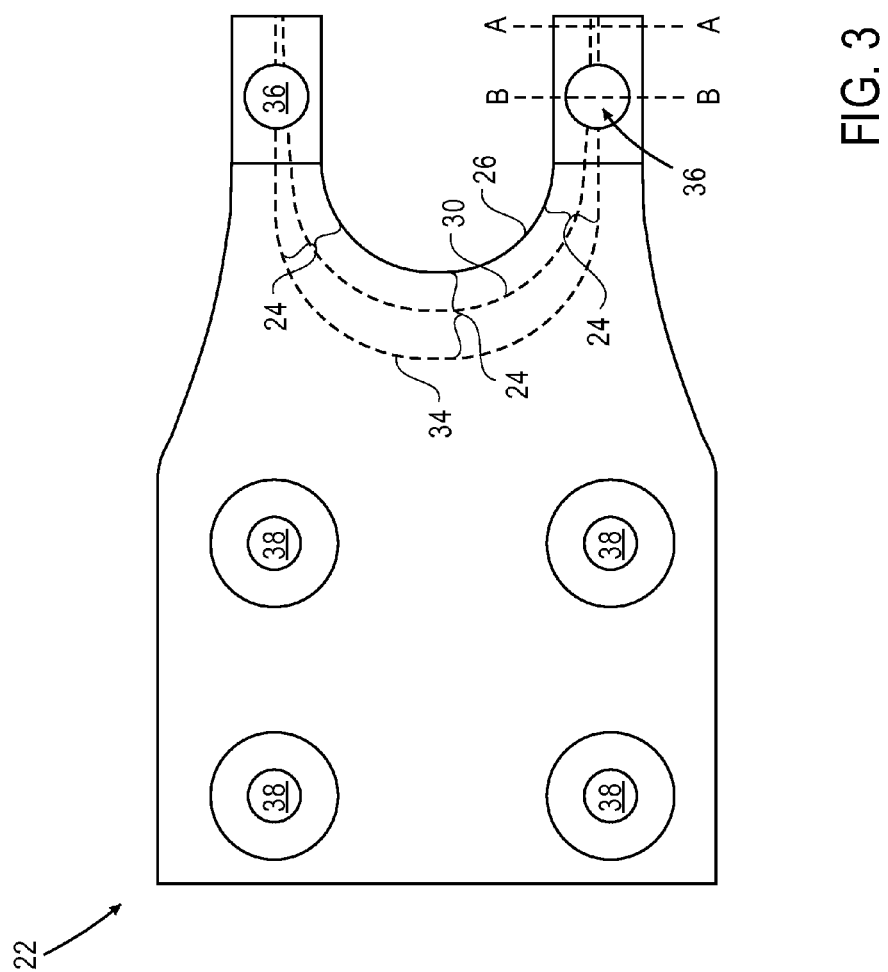
FIG. 3 depicts a top view of a cap gripper, in accordance with one embodiment of the invention.

FIG. 3 depicts a top view of cap gripper 22, in accordance with one embodiment of the invention. It is noted that descriptive phrases (e.g., such as "top view", "side view", "bottom view") which concern an orientation of cap gripper 22 are provided for ease of description, and do not in any way restrict the actual orientation of cap gripper 22. When so oriented (i.e., in accordance with the "top view", "side view", etc. descriptive terminology), cap gripper 22 may be used to grip cap 2 as orientated in FIG. 1.

Cap gripper 22 may comprise a u-shaped collar 24 having edge 26. The portion of collar 24 that is visible in FIG. 3 is the top surface of collar 24. From the top view of FIG. 3, shoulder 28 and groove 32 (described in detail below) may not visible. Dashed line 30 indicates the location of an edge of shoulder 28 (if one were able to "see through" the top surface of cap gripper 22). Dashed line 34 indicates the deepest extent of groove 32. Screw holes 36 may be present in cap gripper 22, allowing movement impeding members (described below) to be inserted into cap gripper 22. To clarify, FIG. 3 only depicts a partially assembled cap gripper without movement impeding members, while fully assembled cap grippers are depicted and described below.

Also visible from the top view are coupling members 38 for coupling cap gripper 22 to a filling machine (not depicted). In one embodiment, coupling members 38 may be screw holes, allowing cap gripper 22 to be attached to a filling machine (or more precisely, an arm of a filling machine) using screws or bolts.

Figure 4:
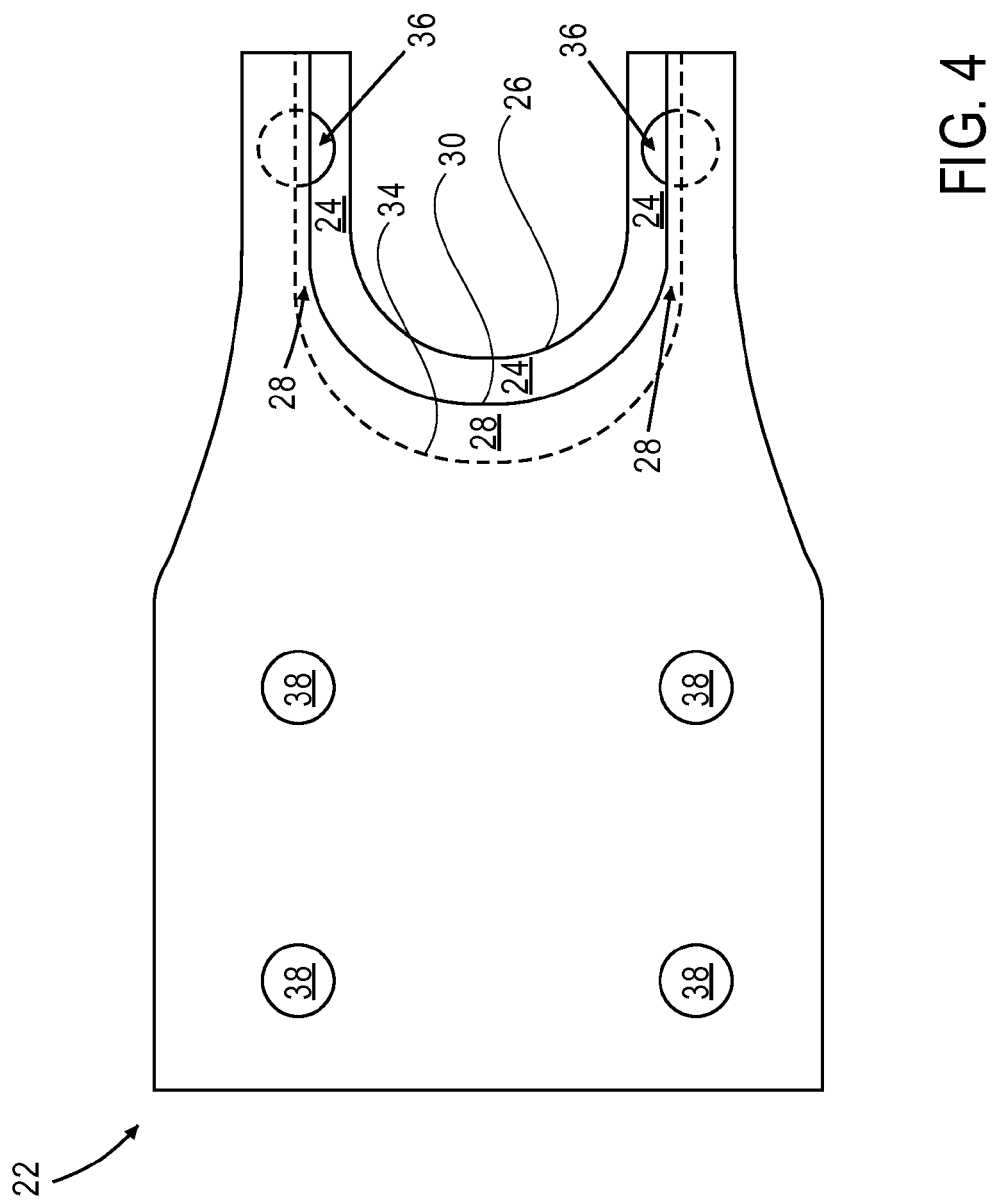
FIG. 4 depicts a bottom view of a cap gripper, in accordance with one embodiment of the invention.

FIG. 4 depicts a bottom view of cap gripper 22, in accordance with one embodiment of the invention. A bottom surface of collar 24 is visible in FIG. 4. Also visible in FIG. 4 is a bottom surface of shoulder 28, as well as a portion of screw holes 36. Since groove 32 is "sandwiched" between collar 24 and shoulder 28, groove 32 is likewise not visible in the bottom view of FIG. 4. Similar to the top view in FIG. 3, dashed line 34 indicates the deepest extent of groove 32.

Figure 5A:
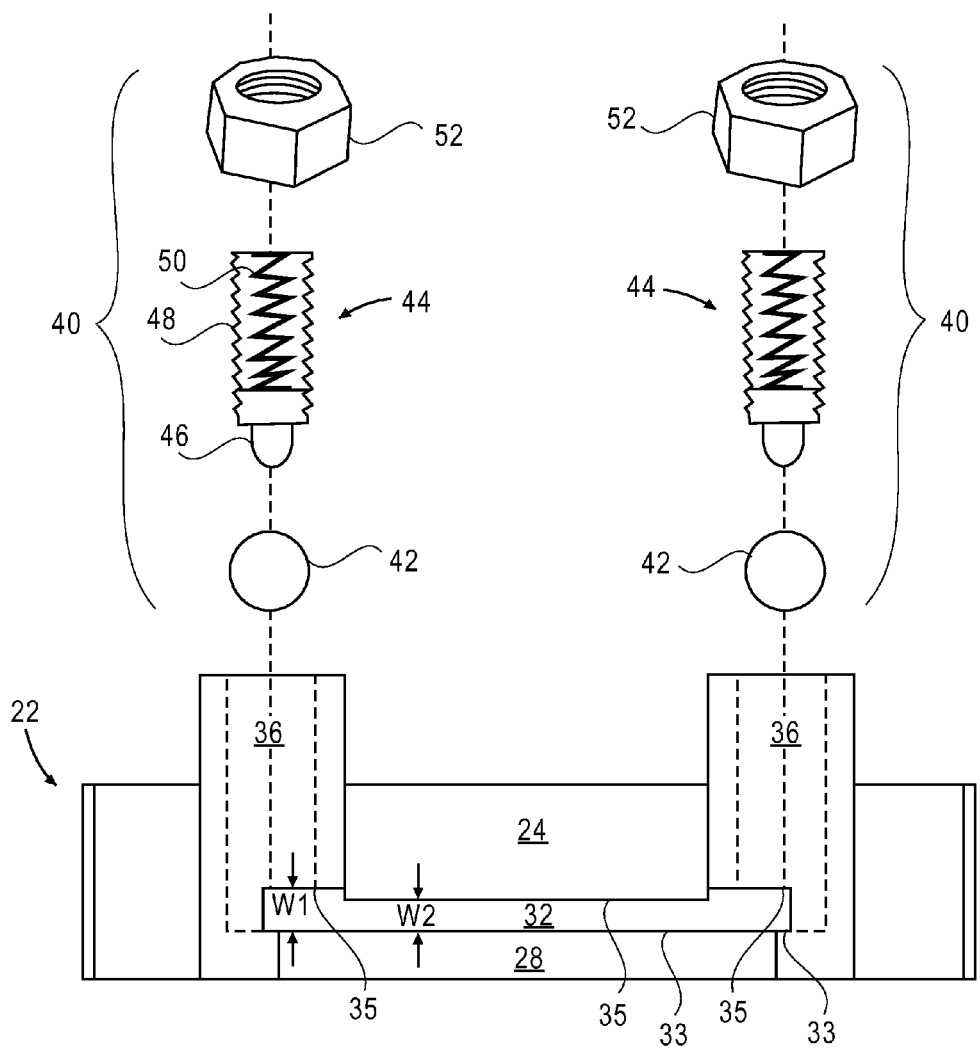
FIG. 5A depicts an exploded front view of a cap gripper, in accordance with one embodiment of the invention.

FIG. 5A depicts an exploded front view of cap gripper 22 (as if one were viewing cap gripper 22 from the right side of FIGS. 3 and 4), in accordance with one embodiment of the invention. Groove 32 is visible in the front view and may be located between collar 24 and shoulder 28. Projecting portion 4 of cap 2 may be positioned (and/or received, mated, etc.) within groove 32 (described below). Groove 32 may have a non-uniform width, with width w1 at its ends and width w2 away from its ends. Groove 32 may have a first surface 33 (depicted as a line since the first surface extends perpendicular to the face of the "paper and/or monitor" on which FIG. 5A is depicted). Groove 32 may additionally have a second surface 35 (depicted as a series of line segments since the second surface likewise extends perpendicular to the face of the "paper and/or monitor" on which FIG. 5A is drawn). Screw holes 36 may extend vertically through cap gripper 22 and may penetrate into groove 32. Since screw holes 36 are not visible from the front view of cap gripper 22, their respective outlines have been drawn in dashed lines.

Also depicted in FIG. 5A is an exploded view of movement impeding members 40, which may each comprise positively biased member 42 (e.g., a ball bearing), a spring-loaded screw 44 and nut 52. Spring-loaded screw may comprise threaded body 48, spring 50 and plunger 46 that is positively biased by the spring. When spring-loaded screw 44 is threaded into screw hole 36, its vertical position is substantially fixed. Vibration induced onto cap gripper 24 (from filling machine and/or cap 16) could over time cause spring-loaded screw 44 to rotate (with respect to its central axis) within screw hole 36, thereby changing its respective vertical position with respect to screw hole 36. To prevent any rotation in spring-loaded screw, nut 52 is secured onto an end of spring-loaded screw 44 that protrudes from cap gripper 22. When secured into screw hole 36, spring 50 positively biases plunger 46, which in turn positively biases positively biased member 42.

Figure 5B:
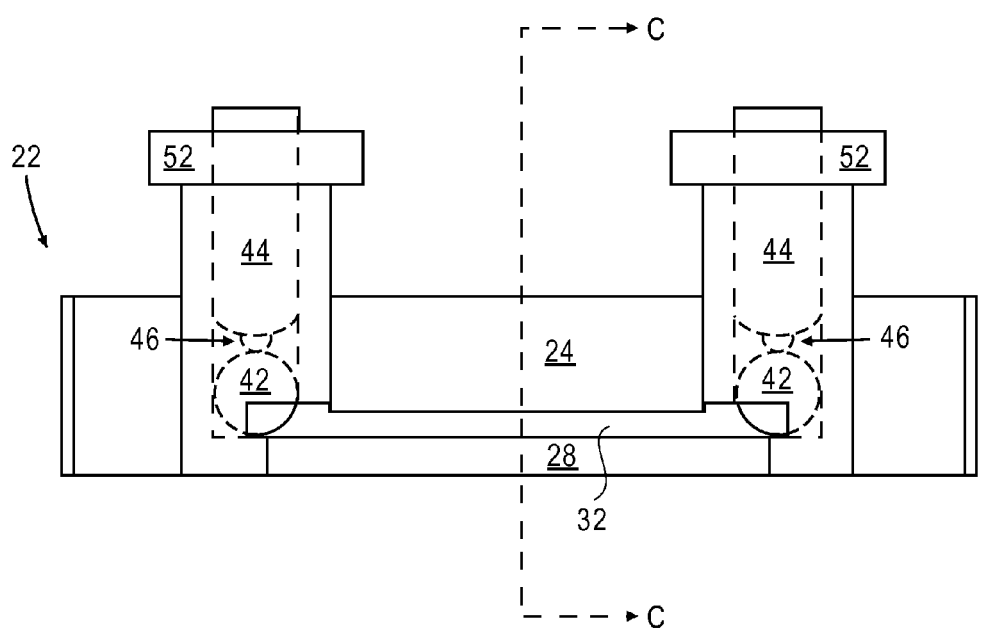
FIG. 5B depicts a front view of a cap gripper, in accordance with one embodiment of the invention.

A front view of cap gripper 22 with movement impeding members 40 assembled therein is depicted in FIG. 5B. Such embodiment of cap gripper 22 is fully assembled and can be used to grip caps. If not already apparent, it is noted that the vertical position of spring-loaded screw 44 with respect to screw hole 36 determines the amount of force needed to depress positively biased member 42 into screw hole 36 (with a higher position resulting in less force and a lower position resulting in more force).

Figure 5C:
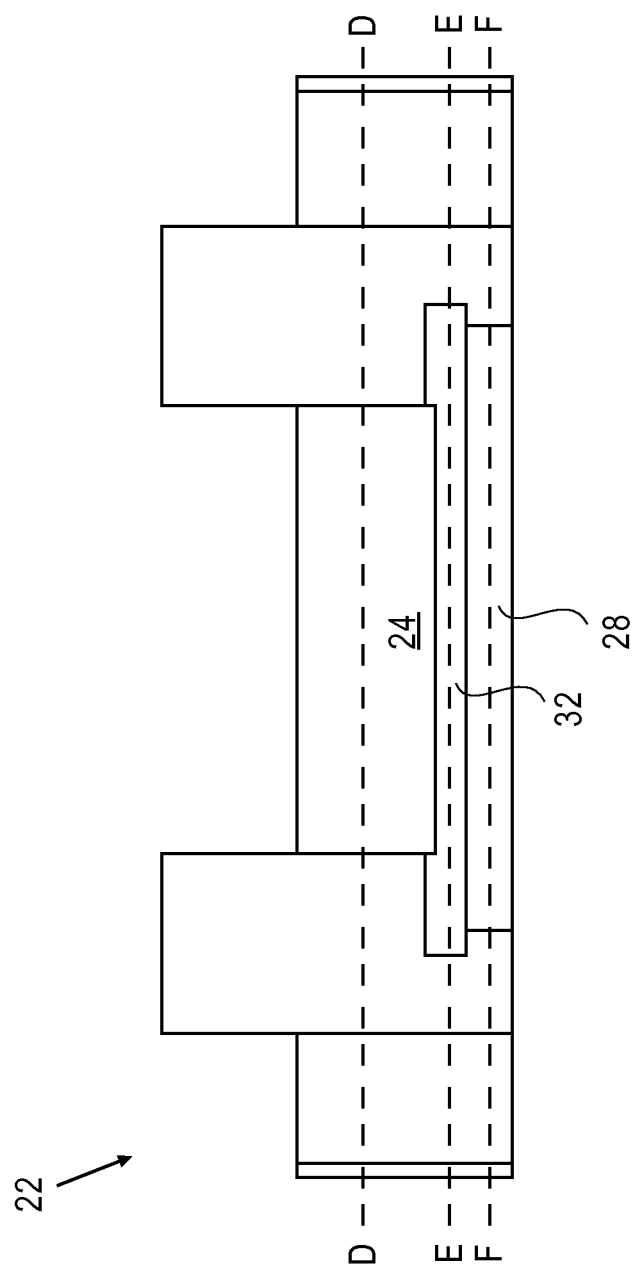
FIG. 5C depicts a front view of a cap gripper with various horizontal cross-sectional cut lines, in accordance with one embodiment of the invention.

FIG. 5C depicts a front view of cap gripper 22 (without movement impeding members 40 for clarity of depiction). The outlines of screw holes 36 have been omitted from FIG. 5C to not unnecessarily clutter the figure, but it is understood that screw holes 36 are still present in the cap gripper of FIG. 5C. Various horizontal cross-sectional cut lines are drawn in FIG. 5C, and the cross-sections at such lines are depicted below in FIGS. 9-11.

Figure 6A:
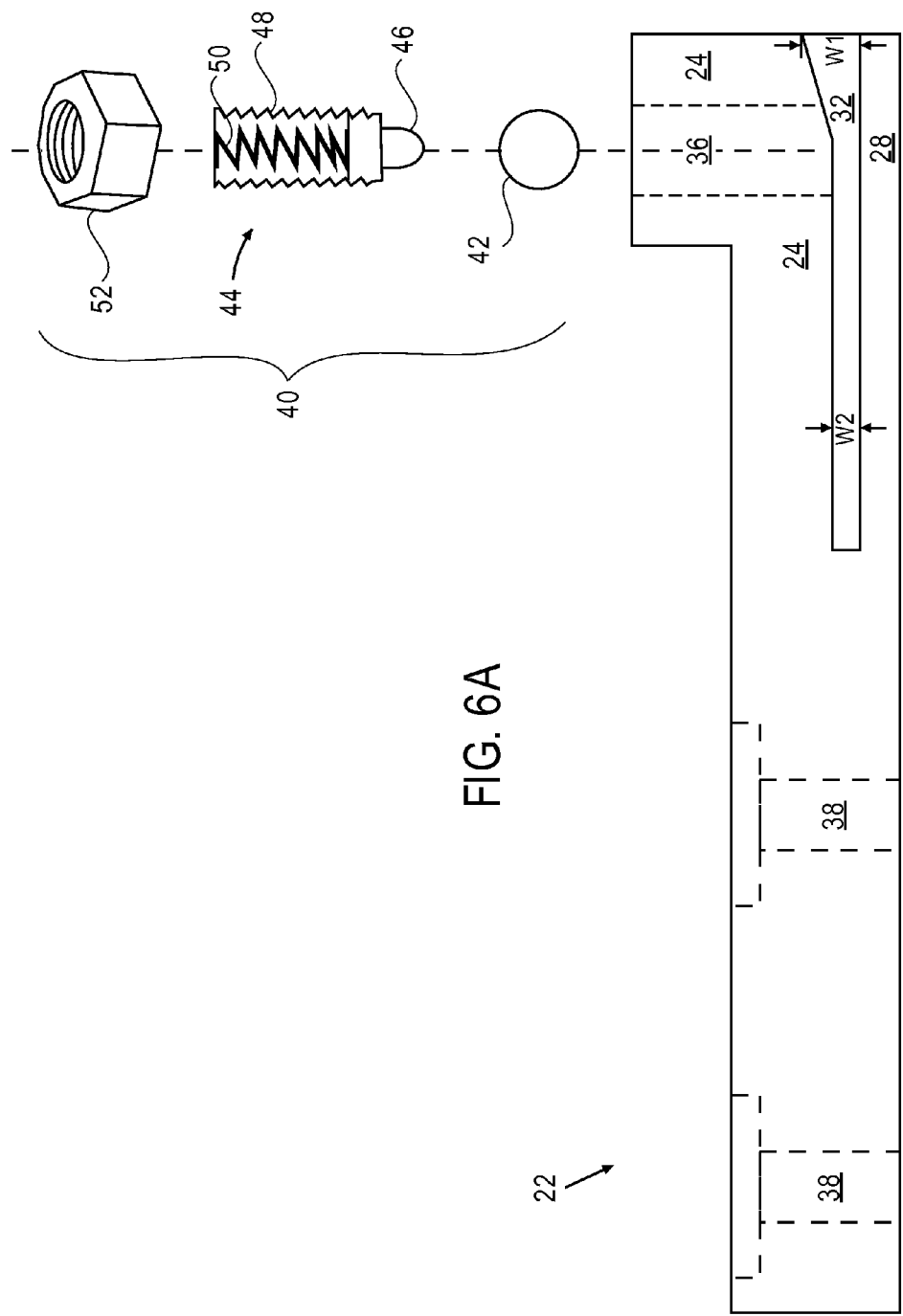
FIG. 6A depicts an exploded cross-sectional view of a cap gripper from the perspective of line C-C, in accordance with one embodiment of the invention.
Figure 6B:
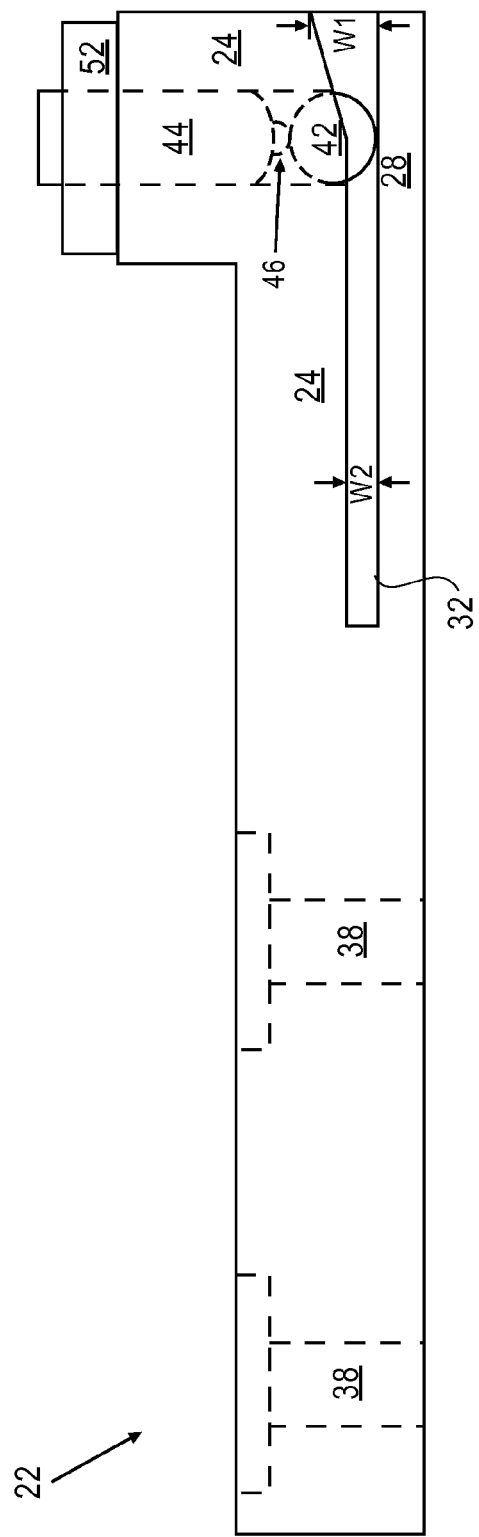
FIG. 6B depicts a cross-sectional view of a cap gripper from the perspective of line C-C, in accordance with one embodiment of the invention.

FIG. 6A depicts an exploded cross-sectional view of cap gripper 22 from the perspective of line C-C (present in FIG. 5B), in accordance with one embodiment of the invention. As depicted, groove 32 is "sandwiched" between collar 24 and shoulder 28. The portion of groove 32 with width w1 is at one end of the groove, while the portion of groove 32 with width w2 is away from both of its ends. Similar to the description of FIGS. 5A-5B, movement impeding member 40 is inserted into screw hole 36 (with nut 52 outside of the screw hole). Screw hole 36 penetrates into groove 32, allowing positively-biased member 42 to protrude out from screw hole 36 into groove 32 (as depicted in the cross-sectional view of FIG. 6B). The outlines of coupling members 38 are also depicted in FIGS. 6A-6B.

Figure 7:
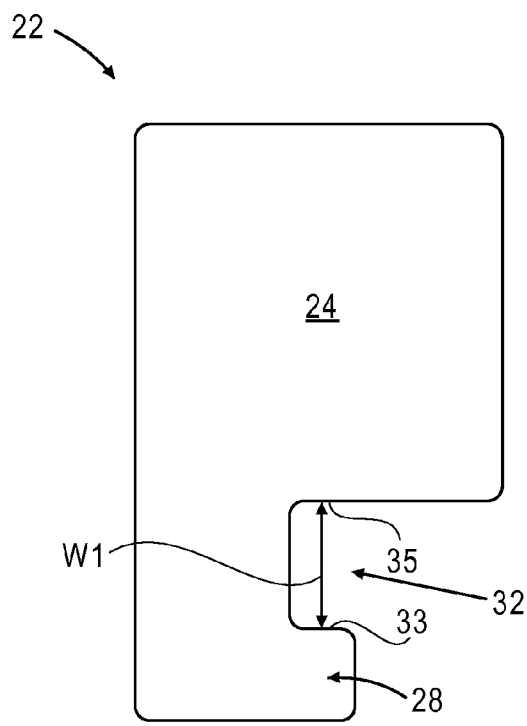
FIG. 7 depicts a cross-section of a cap gripper along line A-A, in accordance with one embodiment of the invention.

FIG. 7 depicts a cross-section of cap gripper 22 along line A-A (depicted in FIG. 3), in accordance with one embodiment of the invention. As depicted, groove 32 is sandwiched between collar 24 and shoulder 28. Groove may comprise a first surface 33 and a second surface 35 (which faces the first surface). The distance separating first surface 33 and second surface 35 may be referred to as the width of groove 32, and at line A-A, such width may measure w1. When cap gripper 22 is coupled to cap 2, projecting portion 4 of cap 2 may rest on shoulder 28 and more specifically, may rest on surface 33 of groove 32.

Figure 8:
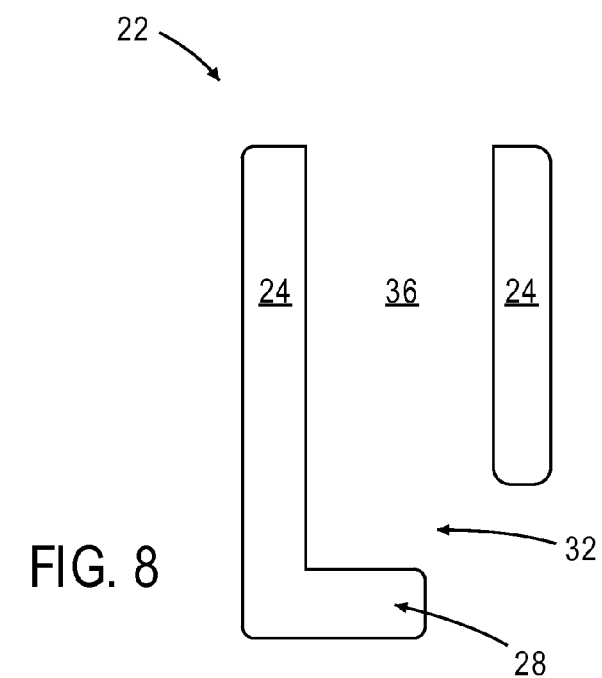
FIG. 8 depicts a cross-section of a cap gripper along line B-B, in accordance with one embodiment of the invention.

FIG. 8 depicts a cross-section of cap gripper 22 along line B-B (depicted in FIG. 3), in accordance with one embodiment of the invention. Line B-B cuts through screw hole 36, and accordingly, screw hole 36 can be seen in the cross-section of FIG. 8. Screw hole 36 penetrates into groove 32, so there is no boundary that separates groove 32 from screw hole 36 at this cross section.

Figure 9:
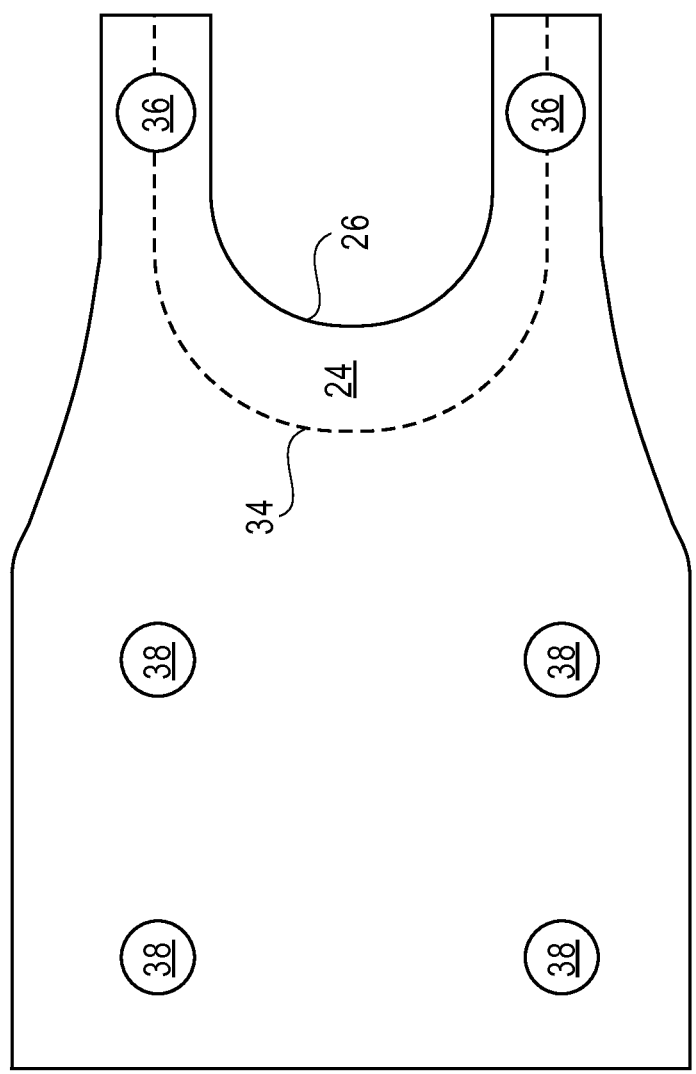
FIG. 9 depicts a cross-section of a cap gripper along line D-D, in accordance with one embodiment of the invention.

FIG. 9 depicts a cross-section of cap gripper 22 along line D-D (drawn in FIG. 5C), in accordance with one embodiment of the invention. In this cross-section, one can see the location of collar 24, and as well as edge 26 of collar 24. Screw holes 36 are visible, as well as coupling members 38.

Figure 10:
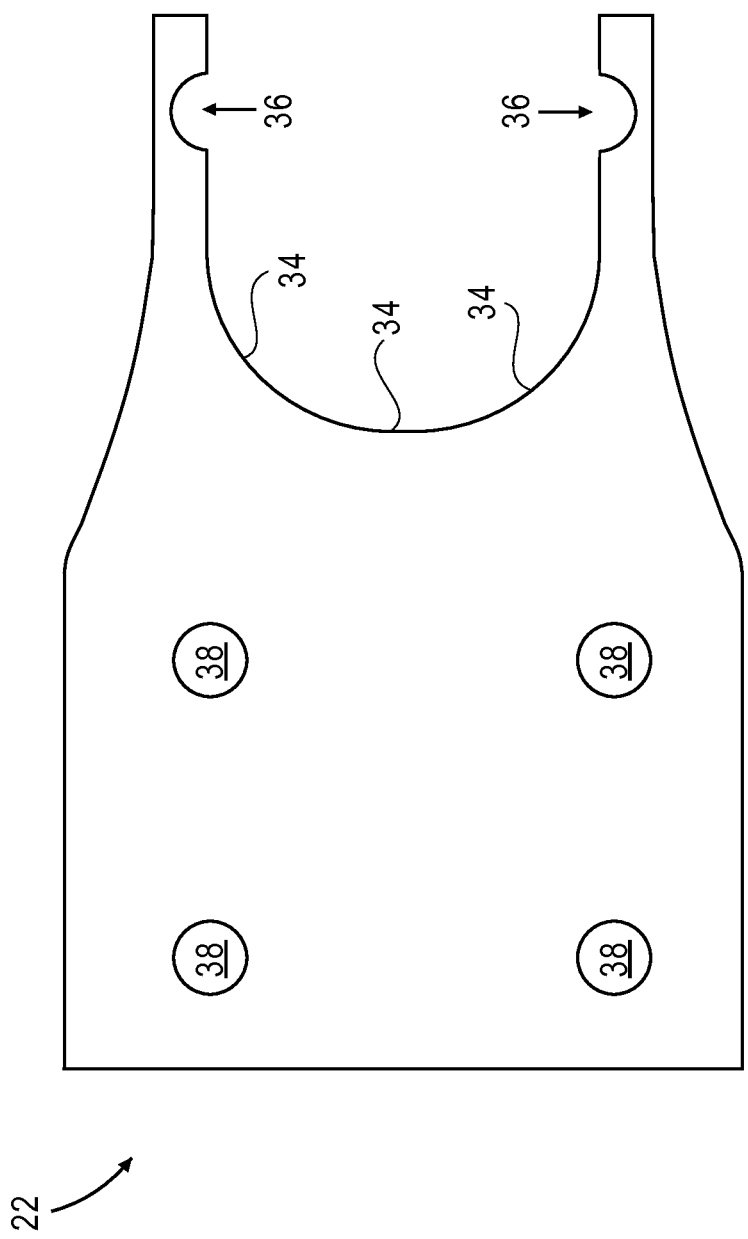
FIG. 10 depicts a cross-section of a cap gripper along line E-E, in accordance with one embodiment of the invention.

FIG. 10 depicts a cross-section of cap gripper 22 along line E-E, in accordance with one embodiment of the invention. In this cross-section, one can see the location of the deepest extent 34 of groove 32, as well as portions of screw holes 36. Coupling members 38 are also visible.

Figure 11:
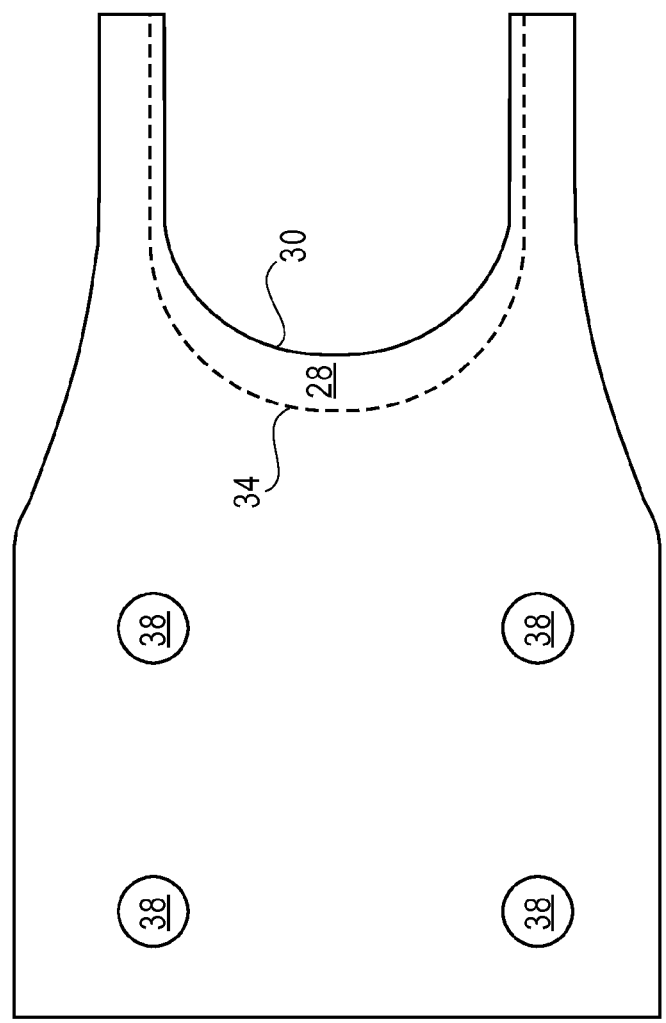
FIG. 11 depicts a cross-section of a cap gripper along line F-F, in accordance with one embodiment of the invention.

FIG. 11 depicts a cross-section of cap gripper 22 along line F-F, in accordance with one embodiment of the invention. In this cross-section, one can see the location of shoulder 28, and as well edge 30 of shoulder 28. Coupling members 38 are visible, but screw holes 36 are not present.

Figure 12C:
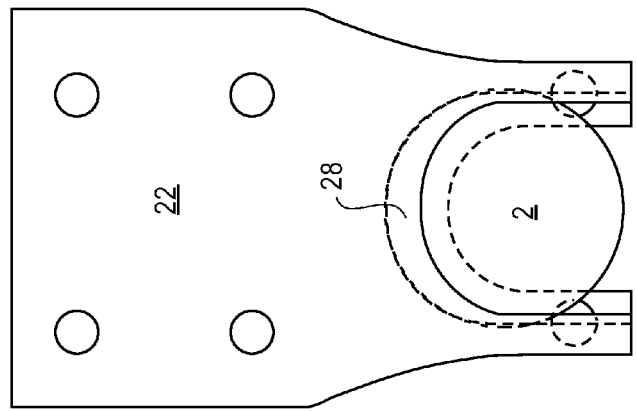
FIGS. 12A-12C depict the position of a cap gripper with respect to a cap at three points in time (from the bottom view), in accordance with one embodiment of the invention.
Figure 12B:
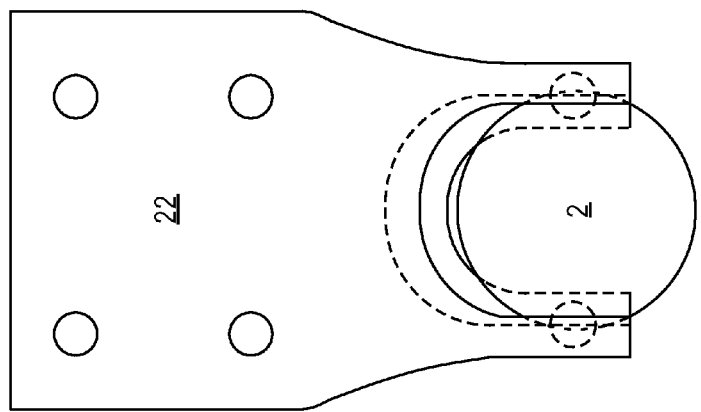
Figure 12A:
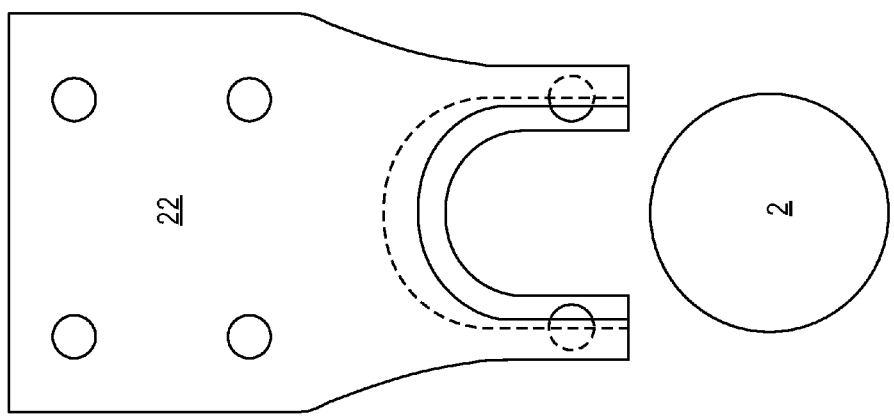

FIGS. 12A-12C depict the position of cap gripper 22 with respect to cap 2 at three points in time (from the bottom view), in accordance with one embodiment of the invention. In FIGS. 12A-12C, cap gripper 22 is depicted as progressively moving towards a stationary cap, before finally "gripping" the cap. In another embodiment, a cap may alternatively be moved towards a stationary cap gripper (not depicted). In yet another embodiment, a cap gripper and a cap may both advance towards each other until they are mated with one another (not depicted). More important to the discussion at hand, however, is the relative position of cap 2 with respect to cap gripper 22.

In FIG. 12A, cap 2 is separate from cap gripper 22. In FIG. 12B, cap 2 is partially mated with cap gripper 22. Two opposing portions of projecting portion 4 of cap 2 (i.e., the outer edge area of the bottom view of cap 2) may be engaged with groove 32. In this position, positively biased members 42 are depressed or partially depressed into screw holes 36 (as further depicted in FIG. 13A). In FIG. 12C, cap 2 is fully mated with cap gripper 22. In this position, a substantial portion of projecting portion 4 of cap 2 may be engaged with groove 32, and the positively biased member 42 (which is no longer depressed into screw hole 36) may "lock" cap 2 in this position (i.e., prevent the cap from sliding out of the groove).

To elaborate, the "locking mechanism" (provided by movement impeding member 40) is advantageous as it secures the position of cap 2 relative to cap gripper 22. As such, a filler machine can position cap gripper 22, and as a result of the "locking mechanism", indirectly position the cap (e.g., into opening 18 of container 16). If the position of cap 2 were not secured relative to cap gripper 22, the filler machine could position cap gripper 22, but it would have no control over the precise position of the cap, which could lead to misalignment problems when attempting to insert cap 2 into opening 18 of container 16.

To further elaborate, cap 2 may need to be anchored in a stationary position (e.g., by container 16) in order to allow cap gripper 22 to grip cap 2. By anchoring cap 2 in a stationary position and engaging groove 32 with projecting portion 4, positively biased member 42 may be depressed into screw hole 36, allowing projecting portion 4 to be fully inserted into groove 32. In another embodiment, cap gripper 22 may be anchored in a stationary position, and cap 2 may be inserted into cap gripper 22. In yet another embodiment, both cap gripper 22 and cap 2 may be advanced towards one another until they are fully coupled with one another.

While FIGS. 12A-12C facilitate the discussion of cap gripper 22 gripping cap 2, the sequence of FIGS. 12A-12C may be reversed (i.e., FIG. 12C, followed by FIG. 12B, followed by FIG. 12A) to depict the removal of cap gripper 22 from cap 2. In a similar manner, the above-discussion associated with FIGS. 12A-12C can be readily extended to the reverse scenario of removing cap gripper 22 from cap 2.

Figure 13A:
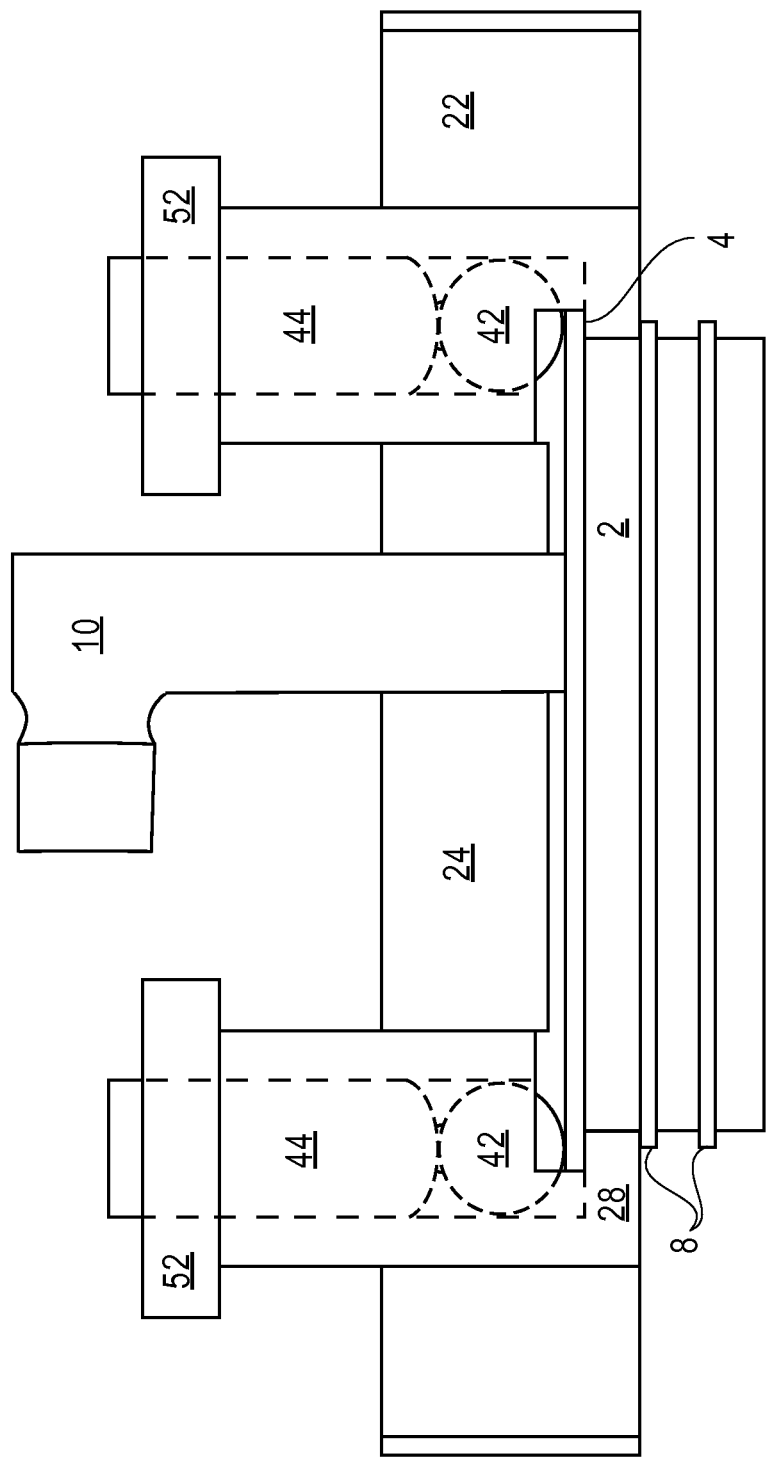
FIGS. 13A-13B depict the position of a cap gripper with respect to a cap at two points in time (from the front view), in accordance with one embodiment of the invention.
Figure 13B:
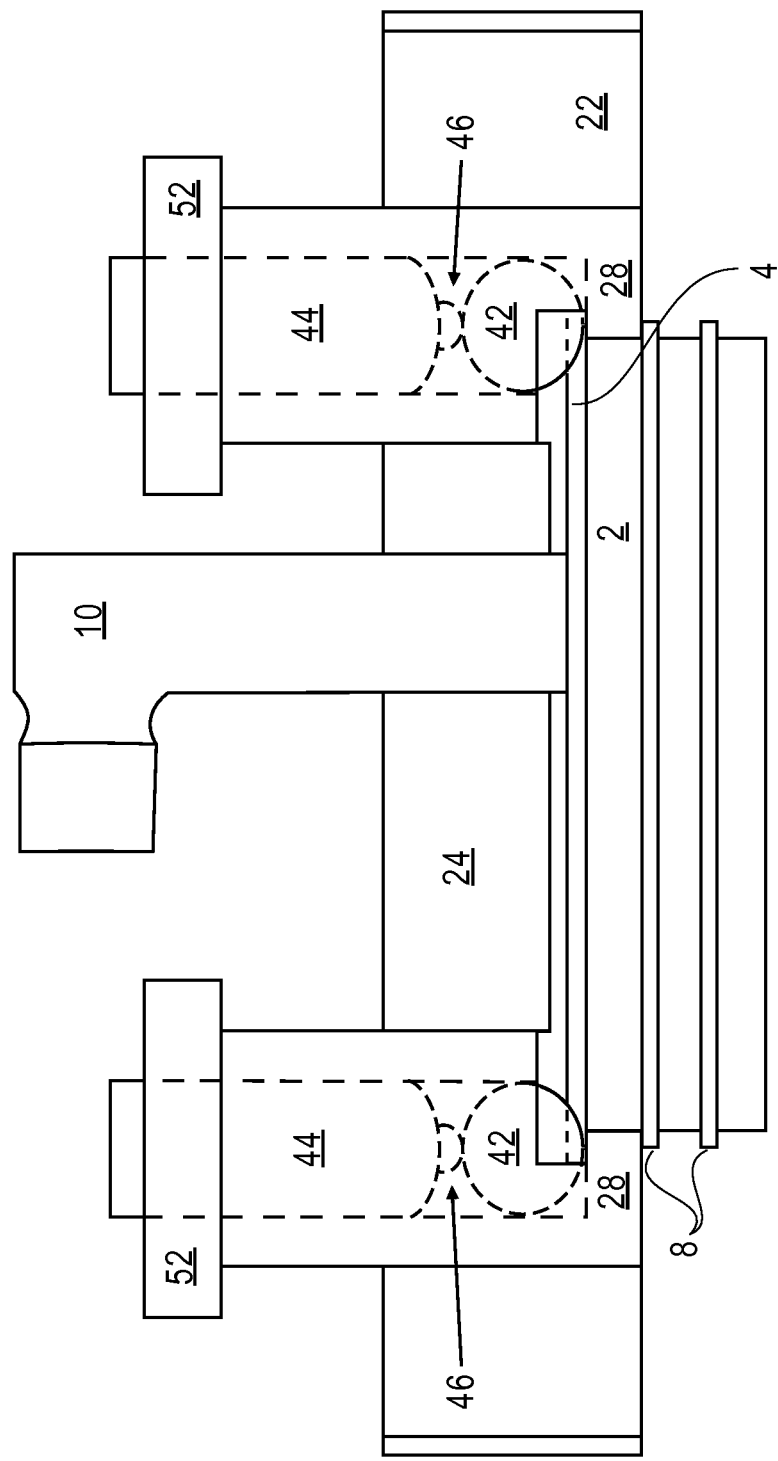

FIGS. 13A-13B depict the position of cap gripper 22 with respect to cap 2 at two points in time (from the front view), in accordance with one embodiment of the invention. More particularly, FIG. 13A corresponds to the time instance at which cap 2 is partially mated with cap gripper 22. At this time instance, protruding portion 4 of cap 2 is engaged in groove 32 and presses positively biased member 42 into screw hole 36. By pressing positively biased member 42 into screw hole 36, positively biased member 42 in turn presses plunger 46 into spring-loaded screw 44. In FIG. 13A, positively biased member 42 presses plunger 46 entirely into spring-loaded screw 44 (and plunger 46 is not depicted in FIG. 13A for this reason). More generally, plunger 46 need not be entirely depressed into spring-loaded screw 44, but could be partially depressed into spring-loaded screw 44. The arrangement depicted in FIG. 13A may be the front view of the arrangement depicted in FIG. 12B.

FIG. 13B corresponds to the time instance at which cap 2 is fully mated with cap gripper 22. At this time instance, protruding portion 4 may be located behind positively biased member 42 (see portion of protruding portion 4 depicted in dashed lines indicating that it is behind positively biased member 42), and positively biased member 42 may no longer be depressed into screw hole 36 (notice plunger 46 being present in FIG. 13B). The positively biased member 42 helps to secure or lock cap 2 into cap gripper 22. The arrangement depicted in FIG. 13B may be the front view of the arrangement depicted in FIG. 12C.

Figure 14A:
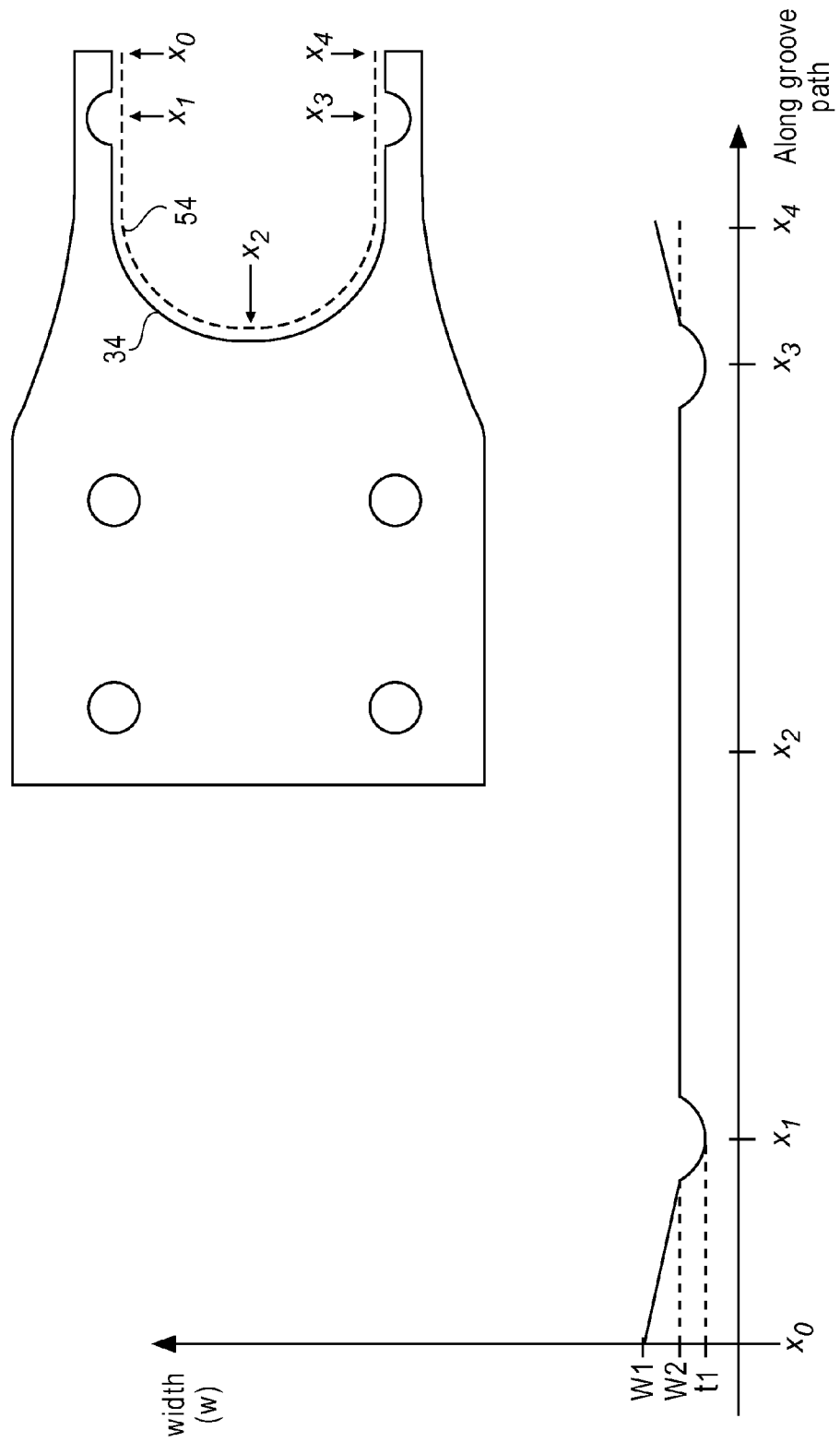
FIGS. 14A-14B depict plots of the groove width versus the groove path at two points in time, in accordance with one embodiment of the invention.
Figure 14B:
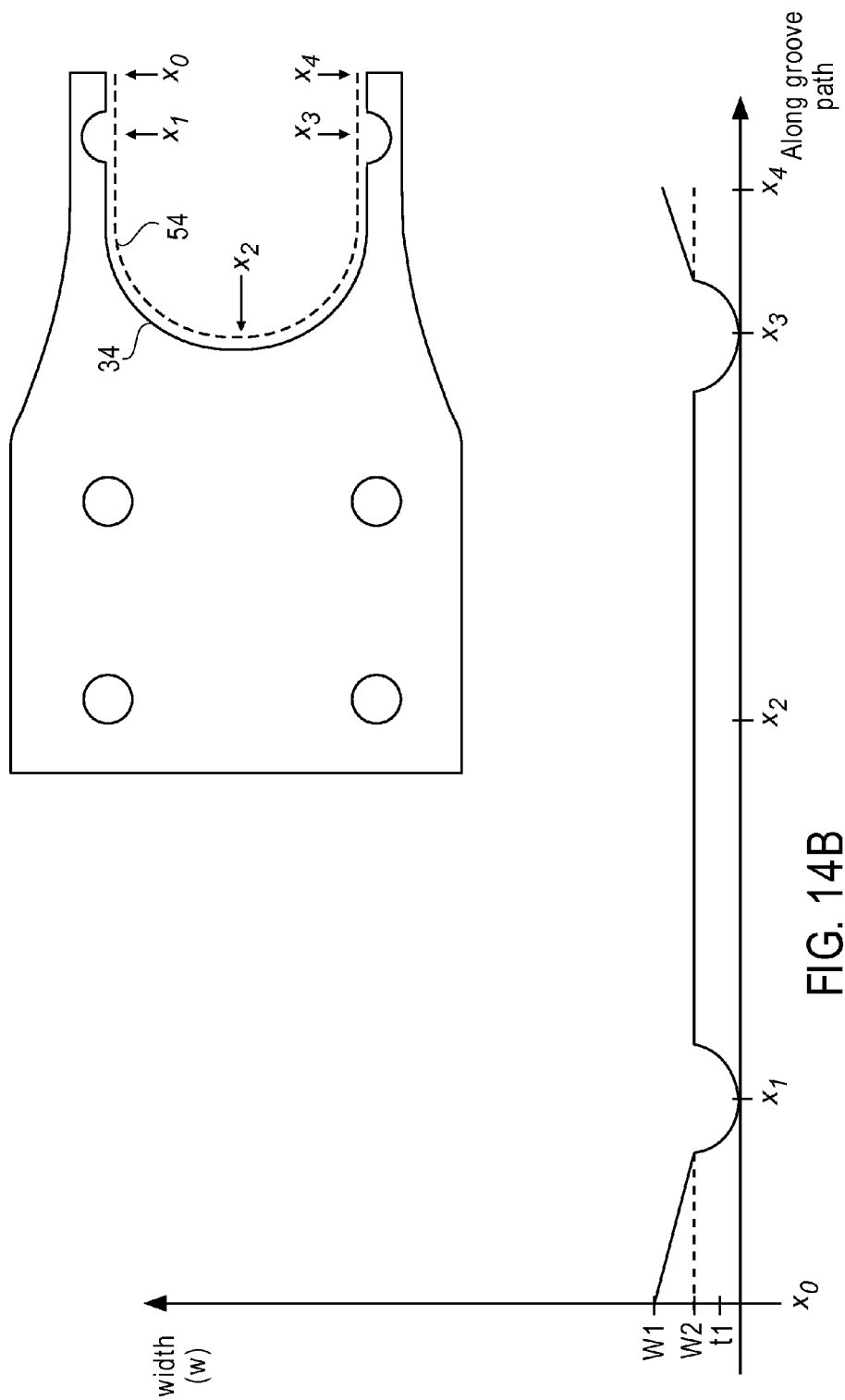

FIGS. 14A-14B depict a plot of the groove width versus the groove path at two points in time, in accordance with one embodiment of the invention. For clarity, the cross section of cap gripper 22 along line E-E is depicted as an inset with groove path 54 annotated thereon. FIG. 14A depicts the groove width at or substantially at the time when cap 2 is partially mated with cap gripper 22 (corresponding to FIGS. 12B and 13A). At points x0, x1, x2, x3 and x4 along the groove path, the groove width may measure w1, t1, w2, t1 and w1, respectively. The gap width w1 may be greater than the gap width w2 to allow cap 2 to more easily vertically align with cap gripper 22 when projecting portion 4 of cap 2 is being initially inserted into groove 32. It is important for width w2 to be greater than the thickness t1 of the projecting portion 4; otherwise, there may not be enough vertical clearance for projecting portion 4 of cap 2 to be inserted into groove 32. If not already apparent, the decrease in the groove width around points x1 and x3 (or narrowing in the groove) may be caused by positively biased member 42 protruding into groove 32. At points, x1 and x3, the groove width is substantially identical to the thickness t1 of the projecting portion 4 because at these points, projecting portion 4 is essentially sandwiched between positively biased member 42 and shoulder 28 (as can be seen in FIG. 13A).

FIG. 14B depicts the groove width at or at substantially the time when cap 2 is fully engaged with cap gripper 22 (corresponding to FIGS. 12C and 13B) or when cap 2 is not engaged with cap gripper 22 at all (corresponding to FIGS. 12A and 5B). At points x0, x1, x2, x3 and x4 along the groove path, the groove width may measure w1, 0, w2, 0 and w1, respectively. The groove width plot of FIG. 14B is similar to that of FIG. 14A, except that at points x1 and x3, the groove width is substantially equal to 0 (or more generally, less than thickness t1) because, at these points, positively biased member 42 presses against shoulder 28, compressing the width of groove 32. Since the groove width is 0 (or less than the thickness t1), projecting portion 4 of cap 2 having thickness t1 may be secured in groove 32.

Figure 15:
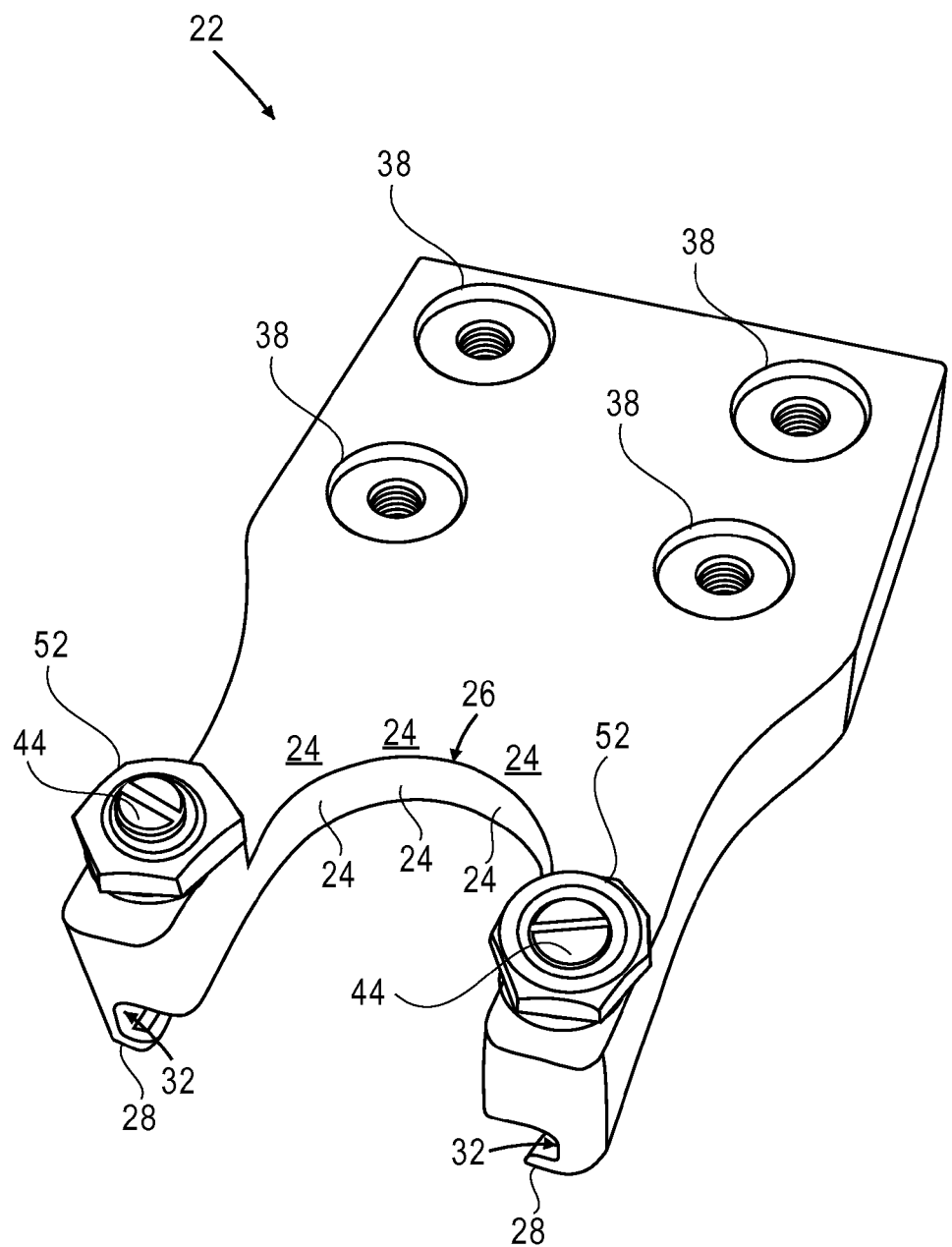
FIG. 15 depicts a perspective line sketch of the top face of the cap gripper, in accordance with one embodiment of the invention.

FIG. 15 depicts a perspective line sketch of the top face of cap gripper 22, in accordance with one embodiment of the invention. Visible in the line sketch of the top face are spring-loaded screws 44 with nuts 52 affixed to respective ends of the screws. Also visible are collar 24 and its edge 26. The ends of groove 32 and shoulder 28 are visible, while the central portions of groove 32 and shoulder 28 are covered by collar 24 (and hence are not visible). Coupling members 38 are also visible.

Figure 16:
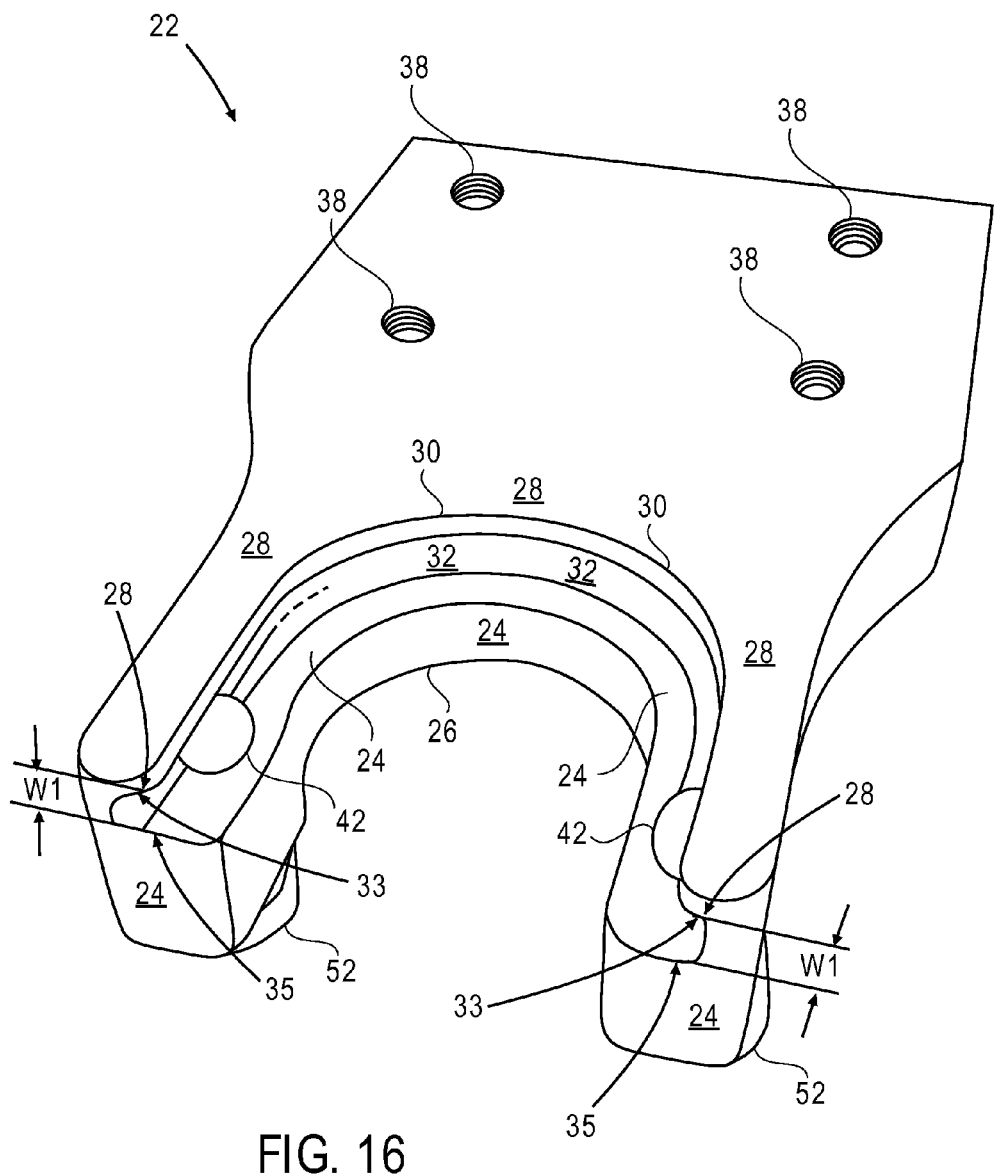
FIG. 16 depicts a perspective line sketch of the bottom face of the cap gripper, in accordance with one embodiment of the invention.

FIG. 16 depicts a perspective line sketch of the bottom face of cap gripper 22, in accordance with one embodiment of the invention. Visible in the line sketch of the bottom face is groove 32 sandwiched between shoulder 28 and collar 24. Positively biased member 42 can be seen protruding from second surface 35 of groove 32. Edge 26 of collar 24 and edge 30 of shoulder 28 are also visible. A small portion of nut 52 is visible under collar 24. Coupling members 38 are also visible.

Figure 17A:
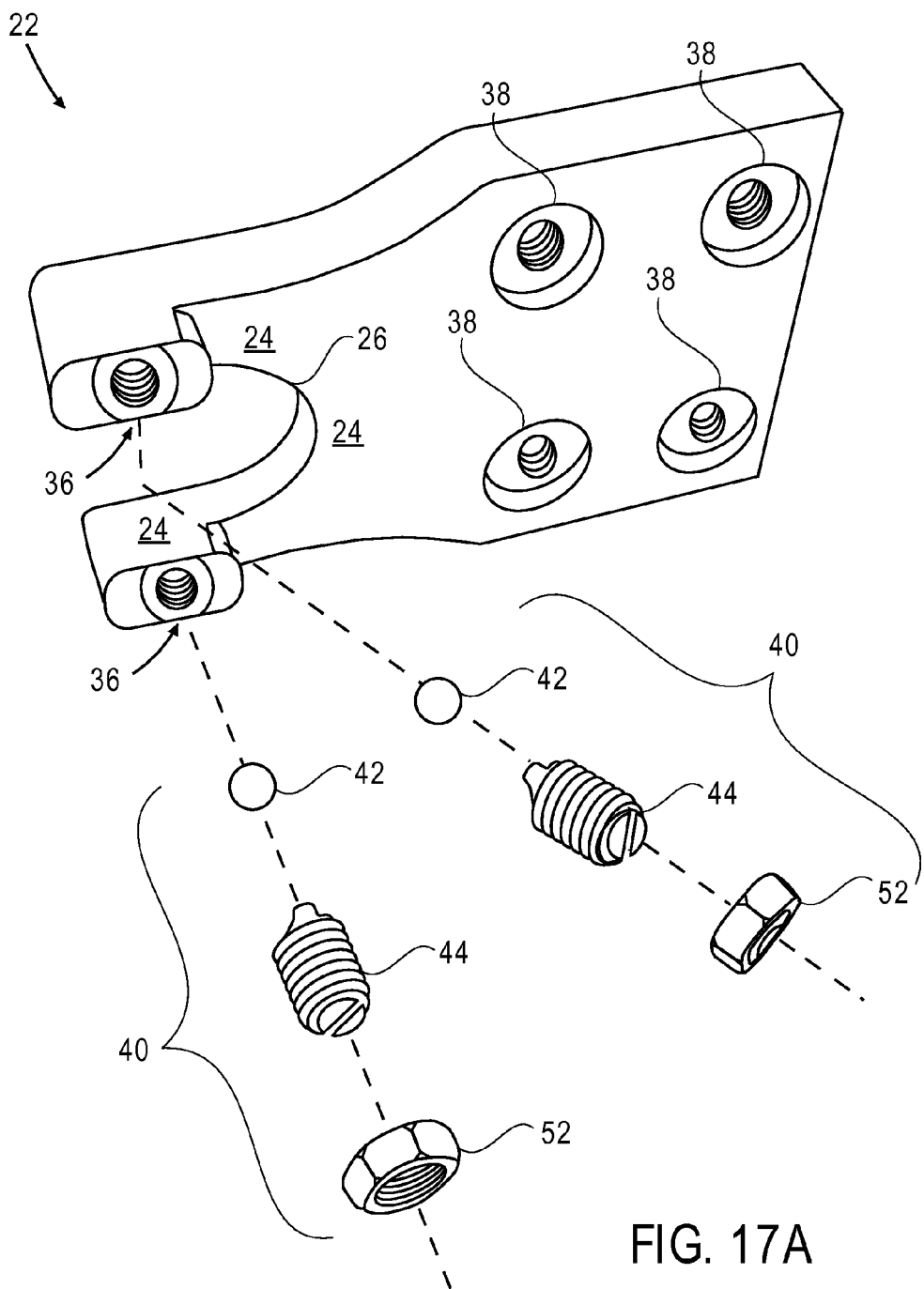
FIG. 17A depicts an exploded line sketch of the top face of the cap gripper (with the cap gripper oriented on its side), in accordance with one embodiment of the invention.

FIG. 17A depicts an exploded line sketch of the top face of cap gripper 22 (with the cap gripper oriented on its side), in accordance with one embodiment of the invention. Screw holes 36 are visible, along with movement impeding members 40 (including positively biased members 42, spring-loaded screws 44 and nuts 52). Collar 24 and its edge 26 are visible, as well as coupling members 38.

Figure 17B:
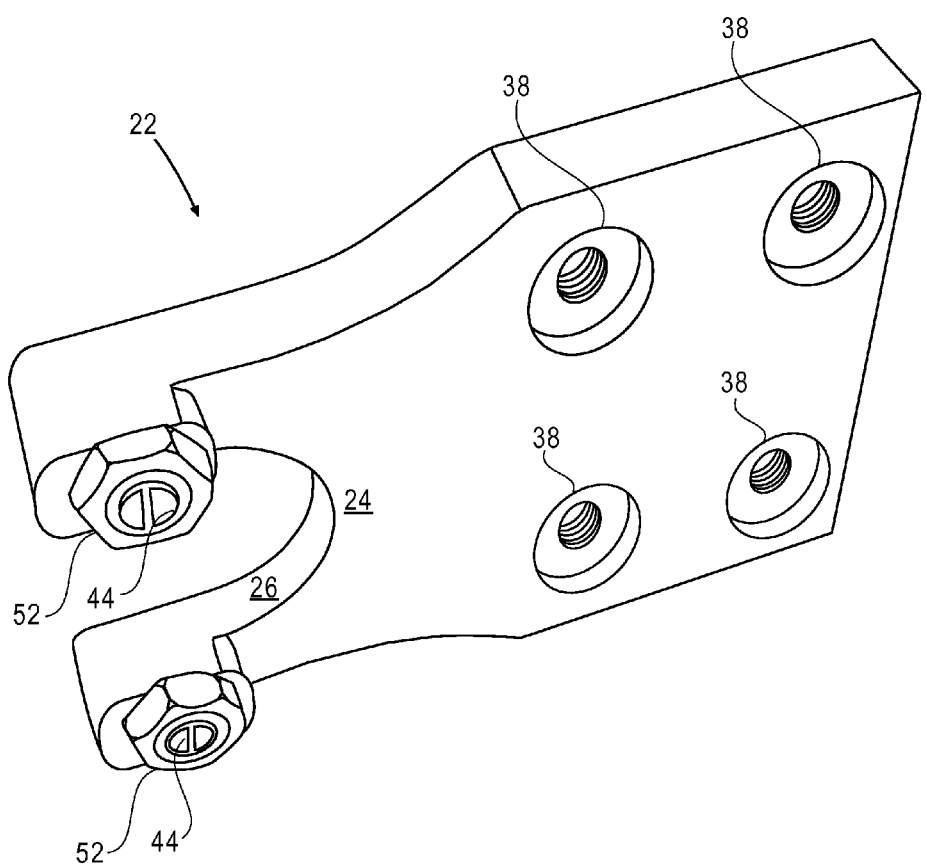
FIG. 17B depicts a perspective line sketch of the top face of the cap gripper (with the cap gripper oriented on its side), in accordance with one embodiment of the invention.

FIG. 17B depicts a perspective line sketch of the top face of cap gripper 22 (with the cap gripper oriented on its side), in accordance with one embodiment of the invention. FIG. 17B is substantially similar to FIG. 17A, except that movement impeding members 40 have been inserted into screw holes 36 (screw holes not visible in FIG. 17B).

Figure 18:
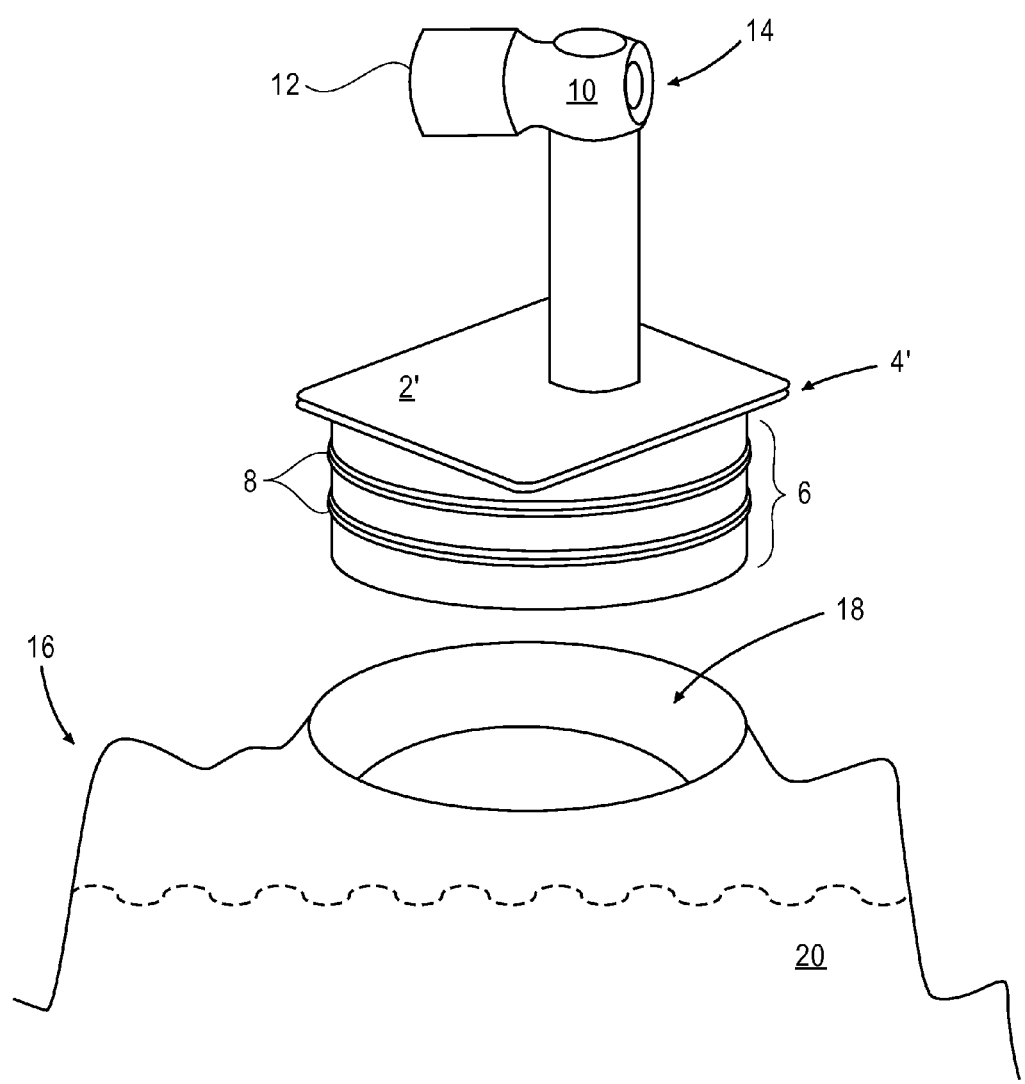
FIG. 18 depicts a perspective illustration of a cap with a rectangular-shaped projecting portion, a spigot and a container for holding liquid.

FIG. 18 depicts a perspective illustration of cap 2' with square-shaped projecting portion 4', spigot 10 and container 16 for holding liquid 20.

Figure 19:
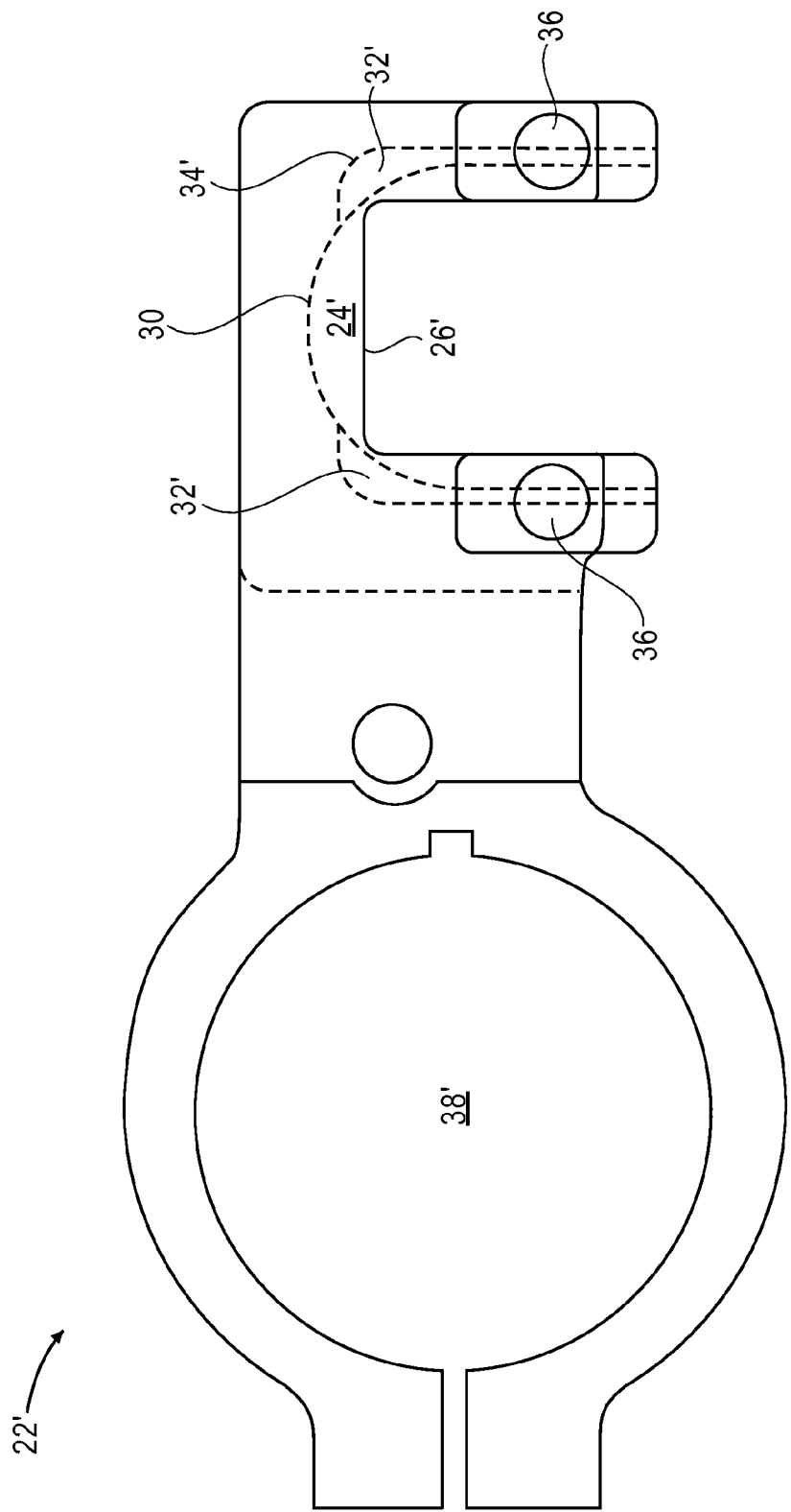
FIG. 19 depicts a top view of a cap gripper, in accordance with one embodiment of the invention.

FIGS. 19-22 depict various views of cap gripper 22', which is adapted to grip cap 2' with square-shaped projecting portion 4'. FIG. 19 depicts a top view of cap gripper 22', in accordance with one embodiment of the invention. Many components of cap gripper 22' are substantially similar to the components of cap gripper 22, and will not be described in detail for conciseness. In cap gripper 22', groove 32' may accommodate square-shaped projecting portion 4', while edge 30 of shoulder 28 may be u-shaped to accommodate the tubular-shaped base 6 of cap 2'. Coupling member 38' may be ring shaped for coupling cap gripper 22' to a cylindrical shaft (depicted in FIG. 23) of a filling machine.

Figure 20:
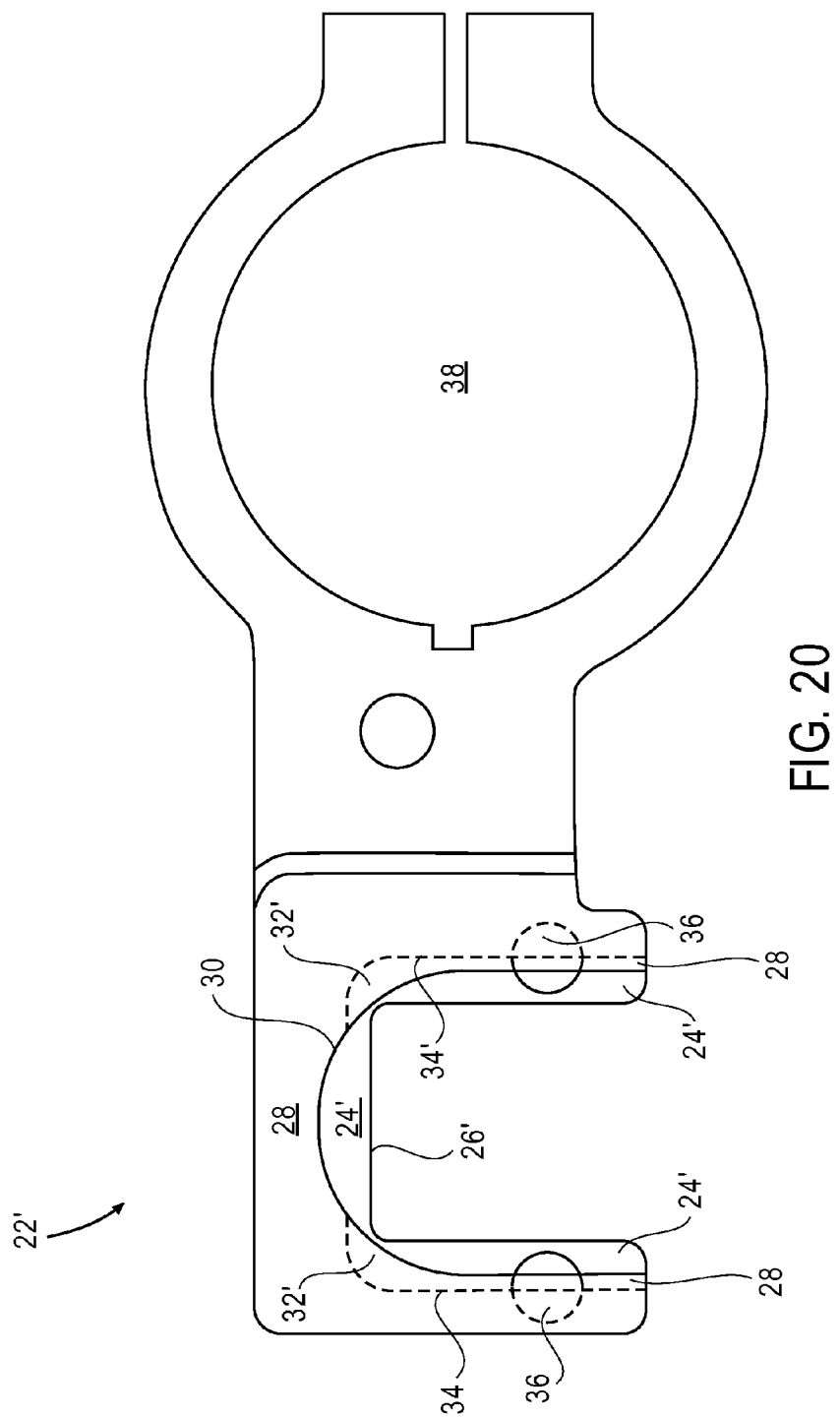
FIG. 20 depicts a bottom view of a cap gripper, in accordance with one embodiment of the invention.

FIG. 20 depicts a bottom view of cap gripper 22', in accordance with one embodiment of the invention. The bottom surface of u-shaped shoulder 28 is visible, along with the bottom surface of square-shaped collar 24' (i.e., square-shaped minus one side of the square). Edge 26' of collar 24' is visible as well as edge 30 of shoulder 28. Groove 32' may comprise two spatially separated segments, in which edge 34' indicates the deepest extent of groove 32'.

Figure 21:
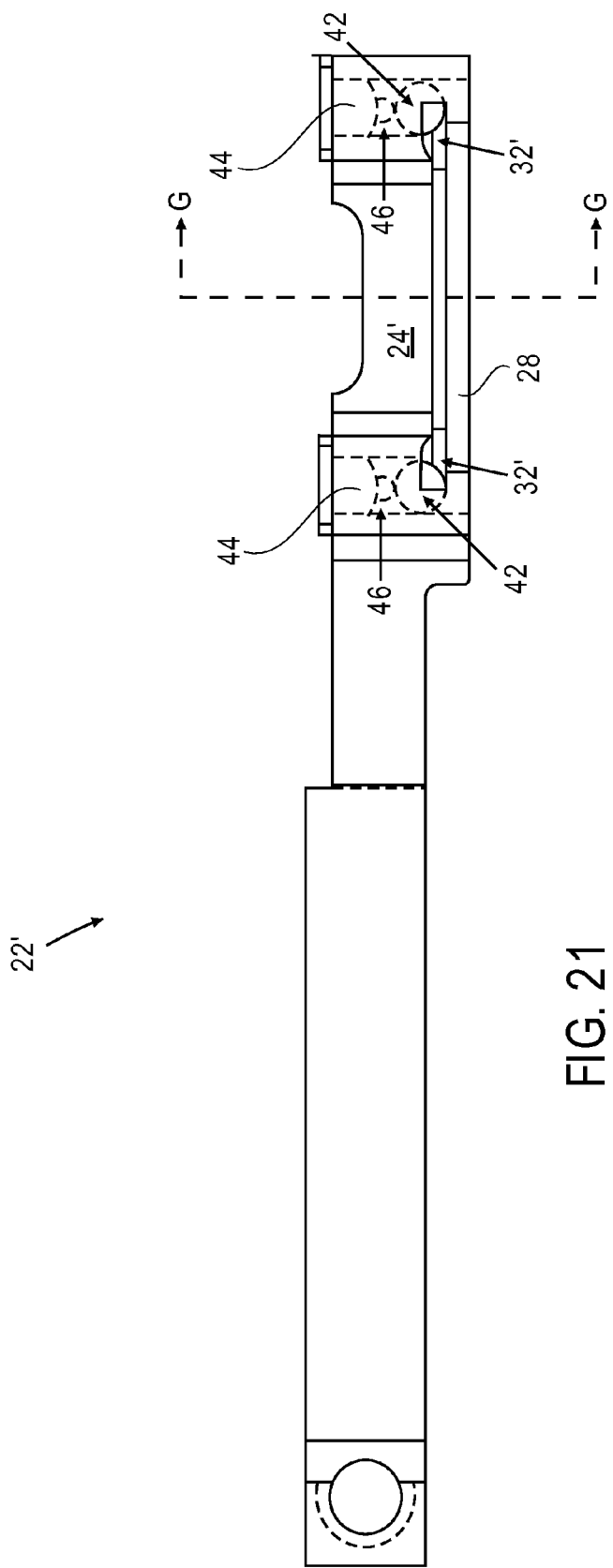
FIG. 21 depicts a front view of a cap gripper, in accordance with one embodiment of the invention.

FIG. 21 depicts a front view of cap gripper 22', in accordance with one embodiment of the invention. As depicted, gap 32' is sandwiched between collar 24' and shoulder 28.

Figure 22:
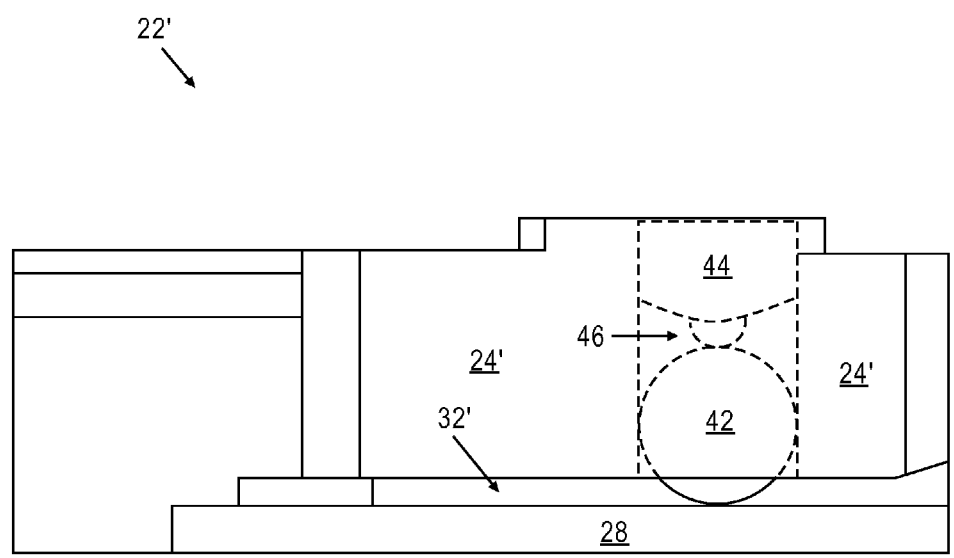
FIG. 22 depicts a cross-sectional view of a cap gripper from the perspective of line G-G, in accordance with one embodiment of the invention.

FIG. 22 depicts a cross-sectional view of cap gripper 22' from the perspective of line G-G (depicted in FIG. 21), in accordance with one embodiment of the invention. As depicted, gap 32' is sandwiched between collar 24' and shoulder 28.

Figure 23:
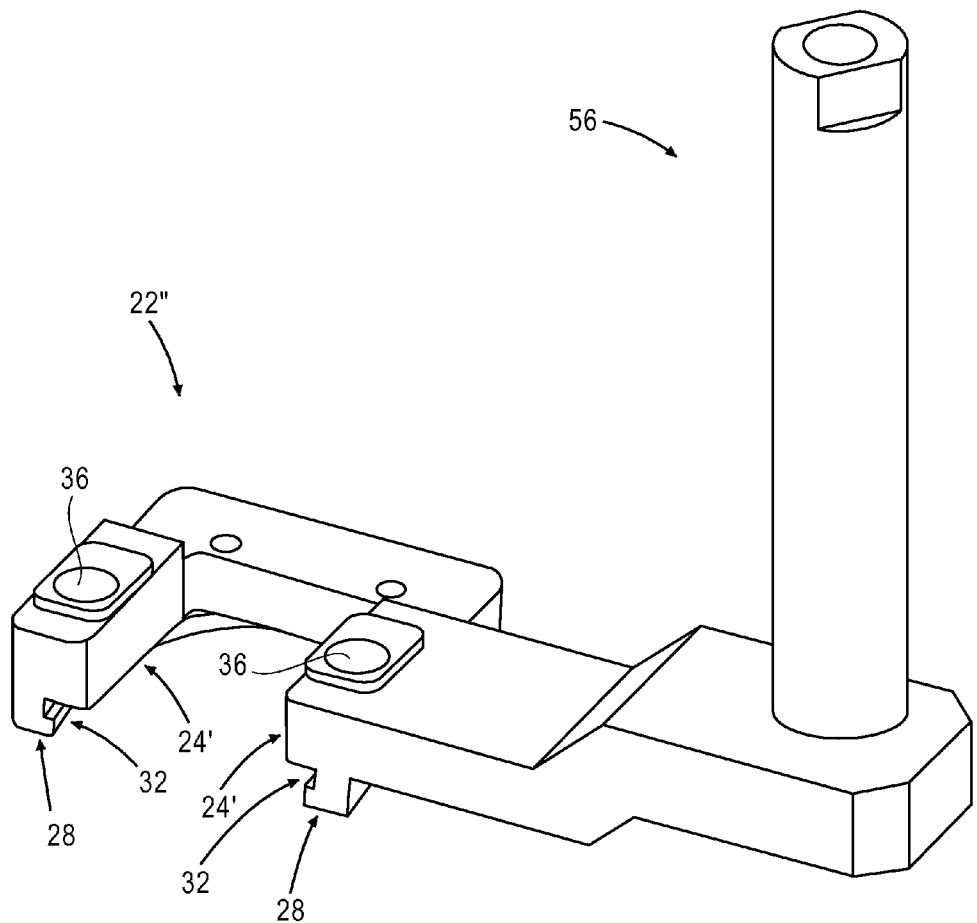
FIG. 23 depicts a perspective view of a cap gripper attached to a cap gripper shaft, in accordance with one embodiment of the invention.

FIG. 23 depicts a perspective view of cap gripper 22" attached to cap gripper shaft 56, in accordance with one embodiment of the invention. By rotating shaft 56, cap gripper 22" can be positioned to grip a cap (not depicted).

Figure 24:
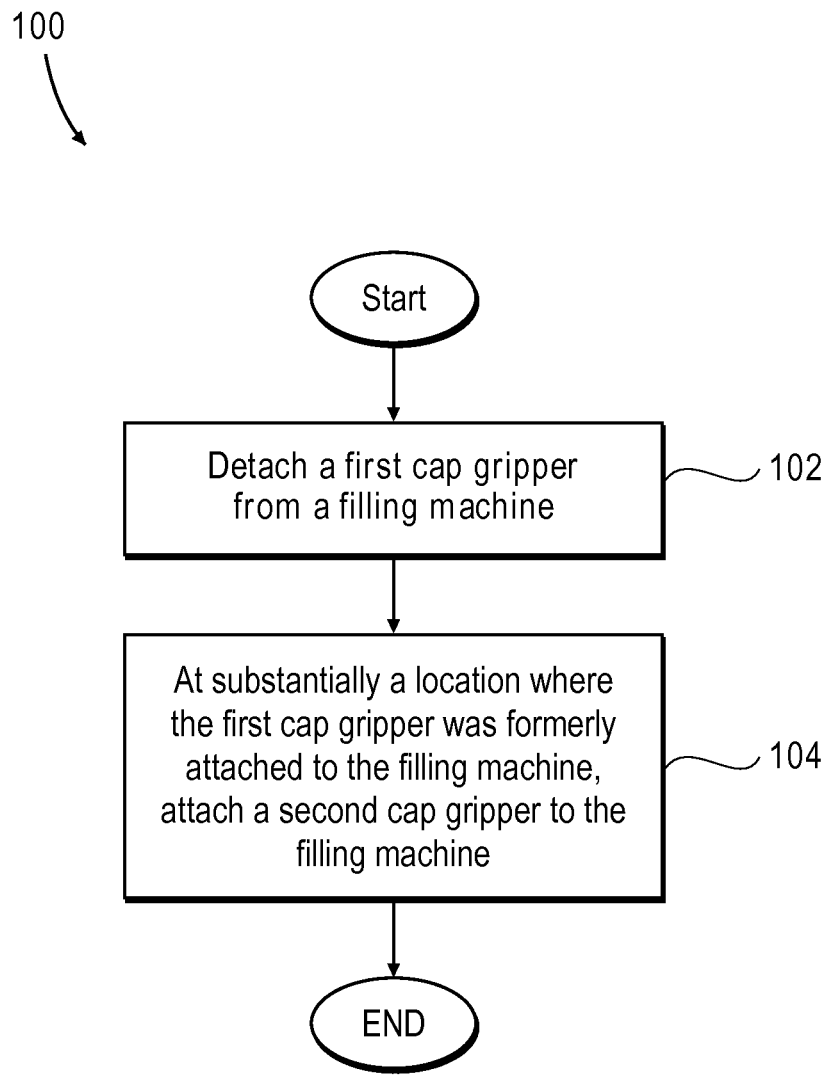
FIG. 24 depicts a flow chart of a method for retrofitting a filling machine with a particular cap gripper, in accordance with one embodiment of the invention.

FIG. 24 depicts a flow chart of method 100 for retrofitting a filling machine with a particular cap gripper, in accordance with one embodiment of the invention. At step 102, a first cap gripper is detached from a filling machine. At step 104, at substantially the location where the first cap gripper was formerly attached to the filling machine, a second cap gripper may be attached to the filling machine. The second cap gripper may comprise a groove configured to receive a radially projecting portion of a cap, and a movement impeding member including a positively biased member arranged to secure the radially projecting portion of the cap within the groove. The positively biased member may create a narrowing in the groove.

One advantage of the cap grippers described herein is that they have a limited number of moveable parts (e.g., limited to spring 44 within spring-loaded screw, plunger 46 and positively biased member 42). As a consequence, the number of parts that can wear out and that need to be replaced is reduced. In turn, this reduces the cost of maintaining a filling machine as well as the time that the filling machine needs to be offline in order to repair one or more cap grippers thereon.

In one embodiment, the cap grippers described herein may be constructed using stainless steel, while other rigid materials may also be suitable for constructing cap grippers.

Thus, a cap gripper for gripping a cap with a radially projecting portion has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A cap gripper, comprising:
   a groove configured to receive a radially projecting portion of a cap, wherein the groove comprises a first surface on which the radially projecting portion rests while the cap is secured in the cap gripper and wherein an entirety of the first surface on which the radially projecting portion rests is disposed within a first plane; and
   a movement impeding member including a positively biased member arranged to secure the radially projecting portion of the cap within the groove, wherein the positively biased member creates a narrowing in the groove and is displaceable within the groove between a first position and a second position in a direction perpendicular to the first plane.

2. The cap gripper of claim 1, wherein the radially projecting portion is a flange-shaped portion.

3. The cap gripper of claim 1, wherein the radially projecting portion has a circular-shaped outer edge.

4. The cap gripper of claim 1, wherein the radially projecting portion has a square-shaped outer edge.

5. The cap gripper of claim 1, wherein the positively biased member comprises a ball bearing.

6. The cap gripper of claim 1, wherein the movement impeding member further comprises a spring-loaded screw, and wherein the spring-loaded screw is threaded into a screw hole of the cap gripper and imparts a positive bias onto the positively biased member.

7. The cap gripper of claim 6, wherein the movement impeding member further comprises a nut, wherein the nut is threaded onto an end of the spring-loaded screw so as to fix a position of the spring-loaded screw with respect to the screw hole of the cap gripper.

8. The cap gripper of claim 6, wherein the screw hole penetrates into the groove of the cap gripper.

9. The cap gripper of claim 1, wherein the groove comprises at least one surface, and wherein the positively biased member projects from the at least one surface of the groove.

10. The cap gripper of claim 1, wherein the groove further comprises a second surface which faces the first surface, and wherein the positively biased member projects from the second surface.

11. The cap gripper of claim 10, wherein the positively biased member is partially depressible into the second surface, allowing the radially projecting portion of the cap to be inserted into the groove.

12. The cap gripper of claim 10, wherein the positively biased member is partially depressible into the second surface, allowing the radially projecting portion of the cap to be removed from the groove.

13. The cap gripper of claim 1, wherein the groove traces a two-dimensional path, and wherein the positively biased member creates a narrowing in a width of the groove at one point along the two-dimensional path.

14. The cap gripper of claim 1, wherein the groove traces a u-shaped path, and wherein the positively biased member creates a narrowing in a width of the groove at one point along the u-shaped path.

15. The cap gripper of claim 1, wherein the positively biased member is located in the first position when the radially projecting portion is partially inserted into the groove, and is located in the second position when the radially projecting portion is either fully inserted into the groove or not inserted in the groove.

16. The cap gripper of claim 1, wherein the positively biased member contacts the radially projecting portion when the radially projecting portion is partially inserted into the groove.

17. A cap gripper, comprising:
   a groove configured to receive a radially projecting portion of a cap; and
   a movement impeding member including:
      a positively biased member arranged to secure the radially projecting portion of the cap within the groove of the cap gripper;
      a spring-loaded screw threaded into a screw hole of the cap gripper, wherein the spring-loaded screw imparts a positive bias onto the positively biased member; and
      a nut threaded onto an end of the spring-loaded screw so as to fix a position of the spring-loaded screw with respect to the screw hole of the cap gripper,
   wherein the groove comprises:
      (i) a first surface on which the radially projecting portion rests while the radially projecting portion is secured within the groove of the cap gripper, wherein an entirety of the first surface on which the radially projecting portion rests is disposed within a first plane, and
      (ii) a second surface which faces the first surface, wherein the positively biased member projects from the second surface, and
   wherein the positively biased member creates a narrowing in the groove and is displaceable within the groove between a first position and a second position in a direction perpendicular to the first plane.

* * * * *